US011663677B2

United States Patent
Mukherjee et al.

(10) Patent No.: US 11,663,677 B2
(45) Date of Patent: *May 30, 2023

(54) SYSTEM AND METHOD FOR AUTOMATICALLY GENERATING CALCULATIONS FOR FIELDS IN COMPLIANCE FORMS

(71) Applicant: Intuit Inc., Mountain View, CA (US)

(72) Inventors: Saikat Mukherjee, Fremont, CA (US); Cem Unsal, Alameda, CA (US); William T. Laaser, Palo Alto, CA (US); Mritunjay Kumar, Bangalore (IN); Anu Sreepathy, Bangalore (IN); Per-Kristian Halvorsen, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/331,622

(22) Filed: May 26, 2021

(65) Prior Publication Data

US 2021/0287302 A1 Sep. 16, 2021

Related U.S. Application Data

(63) Continuation of application No. 15/384,907, filed on Dec. 20, 2016, now Pat. No. 11,049,190.

(30) Foreign Application Priority Data

Oct. 20, 2016 (IN) .............................. 201631035834

(51) Int. Cl.
*G06N 20/00* (2019.01)
*G06Q 40/12* (2023.01)
(Continued)

(52) U.S. Cl.
CPC ......... *G06Q 40/123* (2013.12); *G06F 40/174* (2020.01); *G06N 3/126* (2013.01); *G06N 20/00* (2019.01); *G06F 40/194* (2020.01)

(58) Field of Classification Search
None
See application file for complete search history.

(56) References Cited

U.S. PATENT DOCUMENTS 5,555,169 A    9/1996  Namba et al.
6,246,977 B1   6/2001  Messerly et al.
(Continued)

FOREIGN PATENT DOCUMENTS

JP    2013164740 A    8/2013
KR    101585029 B1    1/2016
(Continued)

OTHER PUBLICATIONS

Anonymous, "Form 2441—Child and Dependent Care Expenses," Retrieved from the Internet on Feb. 12, 2020 <URL: http://taxhow.net/static/form/pdf/federal/1580446800/f2441--2016.pdf>, 2-pages, (Year: 2016).

(Continued)

*Primary Examiner* — Paul S Schwarzenberg
(74) *Attorney, Agent, or Firm* — Paradice & Li LLP

(57) ABSTRACT

A method and system to learn new forms to be incorporated into an electronic document preparation system, or to learn the behavior of existing systems, receive form data related to a new form having a plurality of data fields that expect data values based on specific functions. The method and system gather training set data including previously filled forms having completed data fields corresponding to the data fields of the new form. The method and system include multiple analysis modules that each generate candidate functions for providing data values for the data fields of the (Continued)

new form. The method and system evaluate the candidate functions from each analysis technique and select the candidate functions that are most accurate based on comparisons with the training set data.

20 Claims, 4 Drawing Sheets

Related U.S. Application Data

(60) Provisional application No. 62/362,688, filed on Jul. 15, 2016.

(51) Int. Cl.
*G06N 3/126* (2023.01)
*G06F 40/174* (2020.01)
*G06F 40/194* (2020.01)

(56) References Cited

U.S. PATENT DOCUMENTS

| | | |
|---|---|---|
| 6,912,536 B1 | 6/2005 | Ochitani |
| 7,092,922 B2 | 8/2006 | Meng et al. |
| 7,234,103 B1 | 6/2007 | Regan |
| 7,251,781 B2 | 7/2007 | Batchilo et al. |
| 7,254,569 B2 | 8/2007 | Goodman et al. |
| 7,343,551 B1 | 3/2008 | Bourdev |
| 7,500,178 B1 | 3/2009 | O'Donnell |
| 7,561,734 B1 | 7/2009 | Wnek |
| 7,660,779 B2 | 2/2010 | Goodman et al. |
| 7,765,097 B1 | 7/2010 | Yu et al. |
| 7,788,262 B1 | 8/2010 | Shirwadkar |
| 7,853,494 B2 * | 12/2010 | Wyle ................ G06Q 20/207 705/31 |
| 8,032,822 B1 | 10/2011 | Artamonov et al. |
| 8,082,144 B1 * | 12/2011 | Brown ................ G06Q 20/207 704/9 |
| 8,214,362 B1 * | 7/2012 | Djabarov ............ G06F 40/174 707/736 |
| 8,370,143 B1 | 2/2013 | Coker |
| 8,515,972 B1 | 8/2013 | Srikrishna et al. |
| 8,606,665 B1 | 12/2013 | Shaw |
| 8,655,695 B1 | 2/2014 | Qu et al. |
| 8,756,489 B2 | 6/2014 | Richardt et al. |
| 9,069,745 B2 | 6/2015 | Jacobsen et al. |
| 9,430,453 B1 | 8/2016 | Ho |
| 9,652,562 B2 | 5/2017 | Barrus |
| 9,892,106 B1 | 2/2018 | Lesner et al. |
| 10,810,685 B1 | 10/2020 | Pei et al. |
| 10,970,190 B2 | 4/2021 | Kamran et al. |
| 11,163,956 B1 | 11/2021 | De Peuter et al. |
| 2002/0083068 A1 | 6/2002 | Quass et al. |
| 2003/0026459 A1 | 2/2003 | Won et al. |
| 2003/0036912 A1 * | 2/2003 | Sobotta ............ G06F 40/174 705/31 |
| 2003/0233296 A1 | 12/2003 | Wagner |
| 2004/0030540 A1 | 2/2004 | Ovil et al. |
| 2004/0039988 A1 | 2/2004 | Lee et al. |
| 2005/0108406 A1 | 5/2005 | Lee et al. |
| 2005/0108630 A1 | 5/2005 | Wasson et al. |
| 2005/0125746 A1 | 6/2005 | Viola et al. |
| 2005/0235811 A1 | 10/2005 | Dukane |
| 2005/0257148 A1 | 11/2005 | Goodman et al. |
| 2005/0267869 A1 | 12/2005 | Horvitz et al. |
| 2006/0062451 A1 | 3/2006 | Li et al. |
| 2006/0111990 A1 * | 5/2006 | Cohen ................ G06F 40/103 705/32 |
| 2006/0155539 A1 | 7/2006 | Chen et al. |
| 2006/0178961 A1 | 8/2006 | Stanley et al. |
| 2006/0182554 A1 | 8/2006 | Stoizer |
| 2006/0184870 A1 | 8/2006 | Christen et al. |
| 2006/0235811 A1 | 10/2006 | Fairweather |
| 2006/0242180 A1 | 10/2006 | Graf et al. |
| 2007/0112553 A1 | 5/2007 | Jacobson |
| 2007/0129935 A1 | 6/2007 | Uchimoto et al. |
| 2007/0130134 A1 * | 6/2007 | Ramsey ................ G06F 16/951 |
| 2007/0299949 A1 | 12/2007 | Macbeth et al. |
| 2008/0065634 A1 | 3/2008 | Krinsky |
| 2008/0104506 A1 | 5/2008 | Farzindar |
| 2008/0147528 A1 | 6/2008 | Talan et al. |
| 2008/0154824 A1 | 6/2008 | Weir et al. |
| 2008/0227075 A1 | 9/2008 | Poor et al. |
| 2008/0270110 A1 | 10/2008 | Yurick et al. |
| 2008/0313174 A1 | 12/2008 | Barve et al. |
| 2009/0024382 A1 | 1/2009 | Wolvaardt |
| 2009/0089046 A1 | 4/2009 | Uchimoto et al. |
| 2009/0119107 A1 | 5/2009 | Duncan |
| 2009/0119234 A1 | 5/2009 | Pinckney et al. |
| 2009/0182554 A1 | 7/2009 | Abraham et al. |
| 2009/0204881 A1 | 8/2009 | Murthy et al. |
| 2009/0276729 A1 | 11/2009 | Cantu-Paz |
| 2009/0327513 A1 | 12/2009 | Guo et al. |
| 2010/0005096 A1 | 1/2010 | Minagawa et al. |
| 2011/0087671 A1 | 4/2011 | Lee et al. |
| 2011/0258182 A1 | 10/2011 | Singh et al. |
| 2011/0271173 A1 | 11/2011 | Ait-Mokhtar et al. |
| 2012/0089659 A1 | 4/2012 | Halevi et al. |
| 2012/0272160 A1 | 10/2012 | Spivack et al. |
| 2013/0013612 A1 | 1/2013 | Fittges et al. |
| 2014/0019433 A1 | 1/2014 | Effrat et al. |
| 2014/0122988 A1 | 5/2014 | Eigner et al. |
| 2014/0164352 A1 | 6/2014 | Denninghoff |
| 2014/0173406 A1 | 6/2014 | Robelin et al. |
| 2014/0201126 A1 | 7/2014 | Zadeh et al. |
| 2014/0207782 A1 | 7/2014 | Ravid |
| 2014/0223277 A1 | 8/2014 | Kimber et al. |
| 2014/0258825 A1 | 9/2014 | Ghosh et al. |
| 2014/0280166 A1 | 9/2014 | Bryars et al. |
| 2014/0282586 A1 | 9/2014 | Shear et al. |
| 2015/0007007 A1 | 1/2015 | Bryon et al. |
| 2015/0046785 A1 | 2/2015 | Bryon et al. |
| 2015/0058188 A1 * | 2/2015 | Bartlett ................ G06Q 40/123 705/31 |
| 2015/0095753 A1 | 4/2015 | Gajera et al. |
| 2015/0127567 A1 | 5/2015 | Menon et al. |
| 2015/0206067 A1 | 7/2015 | Abu-Mostafa et al. |
| 2015/0254225 A1 | 9/2015 | Chirca |
| 2015/0309992 A1 | 10/2015 | Visel |
| 2015/0317295 A1 | 11/2015 | Sherry et al. |
| 2016/0019197 A1 * | 1/2016 | Iasi ................ G06F 40/174 715/224 |
| 2016/0092557 A1 | 3/2016 | Stojanovic et al. |
| 2016/0117542 A1 | 4/2016 | Klappert et al. |
| 2017/0075873 A1 * | 3/2017 | Shetty ................ G06F 3/0481 |
| 2017/0220540 A1 | 8/2017 | Wang et al. |
| 2017/0228655 A1 | 8/2017 | Alarie et al. |
| 2017/0239576 A1 | 8/2017 | Hsiao |
| 2017/0293607 A1 | 10/2017 | Kolotienko et al. |
| 2017/0337176 A1 | 11/2017 | Cietwierkowski et al. |
| 2018/0018310 A1 | 1/2018 | Unsal |
| 2018/0018311 A1 | 1/2018 | Mukherjee et al. |
| 2018/0018322 A1 | 1/2018 | Mukherjee et al. |
| 2018/0018582 A1 | 1/2018 | Unsal et al. |
| 2018/0018676 A1 | 1/2018 | Mukherjee et al. |
| 2018/0018740 A1 | 1/2018 | Unsal et al. |
| 2018/0018741 A1 | 1/2018 | Mukherjee et al. |
| 2018/0032497 A1 | 2/2018 | Mukherjee et al. |
| 2018/0053120 A1 | 2/2018 | Mukherjee et al. |
| 2018/0098737 A1 | 4/2018 | Villazon-Terrazas et al. |
| 2018/0121337 A1 | 5/2018 | Unsal et al. |
| 2018/0268167 A1 | 9/2018 | Alberton et al. |
| 2018/0341839 A1 | 11/2018 | Malak et al. |
| 2019/0065460 A1 | 2/2019 | Xin et al. |
| 2019/0080627 A1 | 3/2019 | Dey et al. |
| 2020/0151246 A1 | 5/2020 | Mwarabu |
| 2020/0159990 A1 | 5/2020 | Mukherjee et al. |
| 2021/0256210 A1 | 8/2021 | Manandise et al. |
| 2021/0350081 A1 | 11/2021 | De Peuter et al. |
| 2022/0092436 A1 | 3/2022 | Unsal et al. |

(56) References Cited

U.S. PATENT DOCUMENTS

FOREIGN PATENT DOCUMENTS

| WO | 02103555 A1 | 12/2002 |
| WO | 2009061917 A1 | 5/2009 |

OTHER PUBLICATIONS

Borovicka et al., "Selecting Representative Data Sets," Advances in Data Mining Knowledge Discovery and Applications, Chap. 2, pp. 43-70, 2012.

Chu et al., "Data Cleaning: Overview and Emerging Challenges," Proceedings of the 2016 International Conference on Management of Data, pp. 2201-2206, Jun. 2016.

Drechsler et al., "Generating Formal System Models from Natural Language Descriptions," IEEE, pp. 164-165 (Year 2012).

Drummond et al., "Examining the Impacts of Dialogue Content and System Automation on Affect Models in a Spoken Tutorial Dialogue System," Proceedings of the SIGDAL 2011: the 12th Annual Meeting of the Special Interest Group on Discourse and Dialogue, pp. 312-318, Jun. 2011, copyright 2011 ACM, (Year: 2011).

Frantzi, et al., "Automatic Recognition of Multi-Word Terms: The c-value/nc-value Method," International Journal on Digital Libraries 3.2, pp. 115-130, 2000.

Glushko et al., "Document Engineering for e-Business," DocEng '02, Nov. 2002, USA, copyright 2002 ACM, p. 42-48.

Hermens et al., "A Machine-Learning Apprentice for the Completion of Repetitive Forms," Feb. 1994, IEEE, pp. 28-33.

Kordos et al., "Instance Selection with Neural Networks for Regression Problems," Artificial Neural Networks and Machine Learning, ICANN 2012, Lecture Notes in Computer Science, vol. 7553, 8-pages.

Middleton et al., "Capturing Knowledge of User Preferences: Ontologies in Recommender Systems," K-CAP '01 pp. 100-107, copyright 2001, ACM (Year: 2001).

Nakagawa et al., "A Simple but Powerful Automatic Term Extraction Method," COLING-02: COMPUTERM 2002: Second International Workshop on Computational Terminology, 7-pages, 2002.

Research Gate, "Thread of Question and Answers on generating training set data from ResearchGate," retrieved from https://www.researchgate.net/post/How_can_I_Generate_the_training_data_From_the_dataset_of_images, Questions and answers dated Jul. 2015, p. 1-5 (Year: 2015).

Toda et al., "A Probabilistic Approach for Automatically Filling Form-Based Web Interfaces," Proceedings of the VLDB Endowment, vol. 4, No. 3, pp. 151-160, (Year: 2010).

Wang et al., Action Prediction and Identification From Mining Temporal User Behaviors, WSDM'11, Feb. 9-12, 2011, Hong Kong, China, Copyright 2011 ACM, pp. 435-444 (Year: 2011).

Yan et al., Formal Consistency Checking over Specifications in Natural Languages, Design, Automation & Test in Europe Conference & Exibition (DATE), pp. 1677-1682 (Year: 2015).

Zhai et al., "Machine Translation by Modeling Predicate-Argument Structure Transformation," Proceedings of COLING 2012: Technical Papers, pp. 3019-3036, COLING 2012, Mumbai, Dec. 2012.

Zhang, "Genetic Programming for Symbolic Regression," 2015, University of Tennessee, Knoxville, TN 37966, USA (Year: 2015).

\* cited by examiner

SYSTEM AND METHOD FOR AUTOMATICALLY GENERATING CALCULATIONS FOR FIELDS IN COMPLIANCE FORMS

CROSS-REFERENCE TO RELATED CASES

This Patent Application is a continuation of and claims priority to U.S. patent application Ser. No. 15/384,907 entitled "SYSTEM AND METHOD FOR AUTOMATICALLY GENERATING CALCULATIONS FOR FIELDS IN COMPLIANCE FORMS" and filed on Dec. 20, 2016, which claims priority to U.S. Provisional Patent Application No. 62/362,688 entitled "SYSTEM AND METHOD FOR MACHINE LEARNING OF CONTEXT OF LINE INSTRUCTIONS FOR VARIOUS DOCUMENT TYPES" and filed on Jul. 15, 2016. This Patent Application also claims priority to India Foreign Patent Application 201631035834, entitled "SYSTEM AND METHOD FOR AUTOMATICALLY GENERATING CALCULATIONS FOR FIELDS IN COMPLIANCE FORMS" and filed Oct. 20, 2016, all of which are assigned to the assignee hereof. The disclosures of all prior Applications are considered part of and are incorporated by reference in this Patent Application.

BACKGROUND

Many people use electronic document preparation systems to help prepare important documents electronically. For example, each year millions of people use electronic tax return preparation systems to help prepare and file their tax returns. Typically, electronic tax return preparation systems receive tax related information from a user and then automatically populate the various fields in electronic versions of government tax forms. Electronic tax return preparation systems represent a potentially flexible, highly accessible, and affordable source of tax return preparation assistance for customers. However, the processes that enable the electronic tax return preparation systems to incorporate new tax forms into the tax return preparation systems often utilize large amounts of human and computing resources.

For instance, due to changes in tax laws, or due to updates in government tax forms, tax forms can change from year to year, or even multiple times in the same year. If a tax form changes, or if a new tax form is introduced, it can be very difficult to efficiently update the electronic tax return preparation system to correctly populate the various fields of the tax forms with the requested values. For example, a particular line of a newly adjusted tax form may request an input according to a function that requires values from other lines of the tax form and/or values from other tax forms or worksheets. These functions range from very simple to very complex. Updating the electronic tax return preparation system often includes utilizing a combination of tax experts, software and system engineers, and large amounts of computing resources to incorporate the new form into the electronic tax return preparation system or to learn the behavior of an existing system. This can lead to delays in releasing an updated version of the electronic tax return preparation system as well as considerable expenses. These expenses are then passed on to customers of the electronic tax return preparation system, as are the delays. Furthermore, these processes for updating electronic tax return preparation systems can introduce inaccuracies into the tax return preparation systems.

These expenses, delays, and possible inaccuracies can have an adverse impact on traditional electronic tax return preparation systems. Customers may lose confidence in the electronic tax return preparation systems. Furthermore, customers may simply decide to utilize less expensive options for preparing their taxes.

These issues and drawbacks are not limited to electronic tax return preparation systems. Any electronic document preparation system that assists users to electronically fill out forms or prepare documents can suffer from these drawbacks when the forms are updated or new forms are released.

What is needed is a method and system that efficiently and accurately incorporates updated forms into an electronic document preparation system.

SUMMARY

Embodiments of the present disclosure address some of the shortcomings associated with traditional electronic document preparation systems by providing methods and systems for incorporating new or updated forms, or for learning the behavior of existing systems, by utilizing multiple independent analysis processes, evaluating the results from each analysis process, and selecting the results that are most accurate. In particular, embodiments of the present disclosure receive form data related to a new form that includes data fields to be completed in accordance with specific functions designated by the new form. Embodiments of the present disclosure utilize multiple separate analysis techniques to generate candidate functions for each selected data field of the new form. The purpose of generating the candidate functions is to find an acceptable candidate function for each data field of the new form. An acceptable candidate function is one that reliably produces data values in accordance with the context or description related to a selected field of the new form. After candidate functions have been generated by the multiple analysis techniques, embodiments of the present disclosure evaluate each of the candidate functions in order to determine which candidate functions most reliably provide correct data values for the selected data field. When an acceptable candidate function has been found for a selected data field, embodiments of the present disclosure can repeat the process for each selected data field of the new form until acceptable candidate functions have been found for each selected data field of the new form. In this way, embodiments of the present disclosure provide a more reliable electronic document preparation system that quickly, efficiently, and reliably learns and incorporates new forms.

In one embodiment, an electronic document preparation system utilizes, for each selected data field of the new form, a machine learning module to generate a first set of candidate functions, a natural language parsing module to generate a second set of candidate functions, and a historical instructions analysis module to generate a third set of candidate functions. The electronic document preparation system tests, for each selected data field of the new form, each of the candidate functions from the first, second, and third set of candidate functions until one or more acceptable candidate functions has been found.

In one embodiment, the electronic document preparation system gathers training set data to assist in evaluating the candidate functions. The training set data includes previously filled forms related to the new form. The previously filled forms include data fields that have already been completed. The electronic document preparation system can utilize the previously filled forms in order to test the accuracy of the candidate functions.

In one embodiment, the electronic document preparation system includes an evaluator module that tests the candidate functions and identifies the acceptable candidate functions. For example, for a first selected data field of the new form, the evaluator module receives the candidate functions from the machine learning module, the natural language parsing module, and the historical instructions analysis module. The evaluator module then generates test data for each candidate function by applying the candidate function to the training set data. The evaluator module then generates matching data for each candidate function by comparing the test data to the completed data fields of the previously filled forms in the training set data. The evaluator module then generates ranking data that ranks each of the candidate functions based on how closely they match the training set data. If one or more of the highest ranked candidate functions matches the training set data within a threshold error tolerance, then the evaluator module identifies these one or more candidate functions as acceptable candidate functions.

In one embodiment, the electronic document preparation system includes an interface module that receives form data related to the new form. The form data can include an electronic version of the new form such as a PDF, a JPG, or other type of file that can represent an electronic version of the new form.

Typically, the form data is not in a structured form in which the data fields, and the text or context that describes them, are not segmented in a way that they can be identified and catalogued. In one embodiment, the electronic document preparation system includes a form analysis module. The form analysis module is configured to analyze the form data and to generate structured form data. The structured form data separates out each line and data field of the new form and all the associated information relevant to the data field. The associated information can be spread across multiple sources including the new form, other forms, instructions related to the forms, publications, etc. Variables are also mapped to each line of the form. The various facts related to each data field can be extracted from the structured form data. These facts include dependencies, constants, mapping tables, etc. These dependents, constants, mapping tables, etc. can be used to generate candidate functions using one or more of the analysis techniques or modules.

In one embodiment, the machine learning module utilizes the dependencies extracted from the structured form data in order to generate candidate functions for each selected data field of the new form. The dependencies can also come from the historical instructions analysis module. The machine learning module utilizes these dependencies, in combination with a library of operators, to generate many candidate functions. The machine learning module can also utilize the training set data in order to find candidate functions that provide data values that closely match the training set data.

In one embodiment, the machine learning module provides to the evaluator module only those candidate functions that have been preliminarily deemed to be more likely to be accurate. Alternatively, the machine learning module can provide all of the generated candidate functions to the evaluator module.

In one embodiment, the historical instructions analysis module analyzes software instructions related to previous versions of an electronic document preparation system. The previous version of the electronic document preparation system already includes software instructions that define functions that compute data values for data fields of historical forms, such as previous versions of the new form. The historical instructions analysis module analyzes the software instructions to generate dependencies data indicating dependencies between variables and then passes the dependencies data to the machine learning module. Additionally, the historical instructions analysis module analyzes the software instructions in greater detail and determines the function used by the previous version of the electronic document preparation system to calculate the data value for a selected field of a previous form that corresponds to the new form. The historical instructions analysis module generates one or more candidate functions from the function used by the previous electronic document preparation system and passes the one or more candidate functions to the evaluator module for further analysis.

In one embodiment, the natural language parsing module analyzes the context data related to the selected data field as contained in the structured form data. The context data may include text or other contextual indications as to what the correct function is for providing data values for the selected data field. The natural language parsing module can use techniques such as semantic parsing in order to determine what are the dependencies in the correct function and what their likely relationships are. The natural language parsing module then generates one or more candidate functions based on the natural language parsing analysis of the context data related to the selected data field. The natural language parsing module then passes the one or more candidate functions to the evaluator module.

In one embodiment, the evaluator module combines the candidate functions from each analysis module and then tests and ranks them in order to determine which is the best candidate function for each selected data field of the new form. The ranking data can indicate, for each candidate function, which analysis module or analysis technique generated the candidate function. The evaluator module can generate the final list of acceptable functions for each of the selected data fields of the new form.

In one embodiment, it is possible that one or more of the analysis modules or techniques will not provide a candidate function for a selected data field of the new form. In this case, the evaluator module will still rank the available candidate functions and determine if one or more of the candidate functions is an acceptable candidate function.

In one embodiment, the form analysis module includes historical structured form data related to a previous version of the new form. The form analysis module can compare the structured form data to the historical structured form data to determine if the description or context data related to a selected data field of the new form is identical to the description or context data related to a corresponding data field in the previous version of the form. If the description or context data related to the selected data field of the new form is not identical to the description or context data related to the corresponding data field in the previous version of the form, then the evaluator module can discard candidate functions from the machine learning module and the historical instructions analysis module. In this case, the ranked list of candidate functions includes only solutions from the natural language parsing module. If the description or context data related to the selected field of the new form is identical to the description or context data related to the corresponding data field in the previous version of the form, then the evaluator module ranks all of the candidate functions from all the analysis modules.

In one embodiment, if two or more candidate functions have identical rankings, then the evaluator module can give priority to candidate functions generated by one of the analysis modules over candidate functions generated by the other analysis modules. For example, the evaluator may give priority to candidate functions generated by the natural language parsing module over candidate functions generated by the historical instructions analysis module and the machine learning module. The evaluator module may also give priority to candidate functions generated by the historical instructions analysis module over candidate functions generated by the machine learning module.

In one embodiment, a method and system for learning and incorporating new forms in an electronic document preparation system can include learning the behavior of existing systems.

Embodiments of the present disclosure address some of the shortcomings associated with traditional electronic document preparation systems that do not adequately and efficiently incorporate new forms. An electronic document preparation system in accordance with one or more embodiments provides efficient and reliable incorporation of new forms by multiple analysis techniques in conjunction with training set data in order to quickly and accurately incorporate and learn new forms. The various embodiments of the disclosure can be implemented to improve the technical fields of data processing, resource management, data collection, and user experience. Therefore, the various described embodiments of the disclosure and their associated benefits amount to significantly more than an abstract idea. In particular, by utilizing multiple analysis techniques and training set data to learn and incorporate new forms in an electronic document preparation system, users can save money and time and can better manage their finances.

Using the disclosed embodiments of a method and system for learning and incorporating new forms in an electronic document preparation system, a method and system for learning and incorporating new forms in an electronic document preparation system more accurately is provided. Therefore, the disclosed embodiments provide a technical solution to the long standing technical problem of efficiently learning and incorporating new forms in an electronic document preparation system.

In addition, the disclosed embodiments of a method and system for learning and incorporating new forms in an electronic document preparation system are also capable of dynamically adapting to constantly changing fields such as tax return preparation and other kinds of document preparation. Consequently, the disclosed embodiments of a method and system for learning and incorporating new forms in an electronic document preparation system also provide a technical solution to the long standing technical problem of static and inflexible electronic document preparation systems.

The result is a much more accurate, adaptable, and robust method and system for learning and incorporating new forms in an electronic document preparation system, but thereby serves to bolster confidence in electronic document preparation systems. This, in turn, results in: less human and processor resources being dedicated to analyzing new forms because more accurate and efficient analysis methods can be implemented, i.e., fewer processing and memory storage assets; less memory and storage bandwidth being dedicated to buffering and storing data; less communication bandwidth being utilized to transmit data for analysis.

The disclosed method and system for learning and incorporating new forms in an electronic document preparation system does not encompass, embody, or preclude other forms of innovation in the area of electronic document preparation system. In addition, the disclosed method and system for learning and incorporating new forms in an electronic document preparation system is not related to any fundamental economic practice, fundamental data processing practice, mental steps, or pen and paper based solutions, and is, in fact, directed to providing solutions to new and existing problems associated with electronic document preparation systems. Consequently, the disclosed method and system for learning and incorporating new forms in an electronic document preparation system, does not encompass, and is not merely, an abstract idea or concept.

Figure 1:
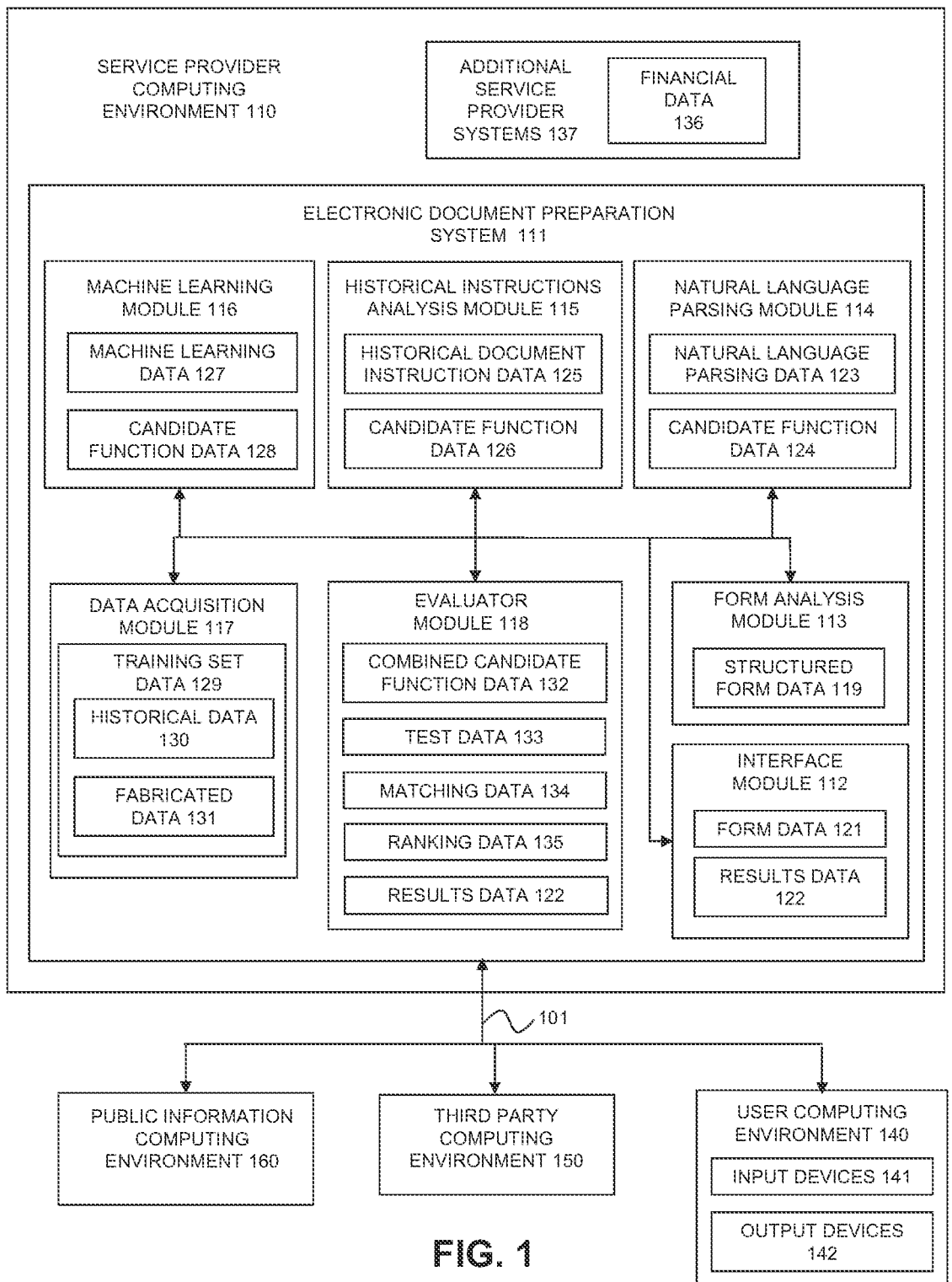
FIG. 1 is a block diagram of software architecture for learning and incorporating new forms in an electronic document preparation system, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed electronic document preparation system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

Hardware Architecture

FIG. 1 illustrates a block diagram of a production environment 100 for learning and incorporating new forms in an electronic document preparation system, according to one embodiment. Embodiments of the present disclosure provide methods and systems for learning and incorporating new forms in an electronic document preparation system, according to one embodiment. In particular, embodiments of the present disclosure receive form data related to a new form having data fields to be completed according to functions set forth in the new form. Embodiments of the present disclosure utilize multiple separate analysis techniques and/or analysis modules in conjunction with training set data to correctly learn the functions for each data field and incorporate them into the electronic document preparation system. Embodiments of the present disclosure gather training set data including previously filled forms related to the new form. Embodiments of the present disclosure utilize the multiple analysis techniques to generate a plurality of candidate functions for each data field to be learned. Embodiments of the present disclosure generate test data for each candidate function from the various analysis techniques by applying the candidate function to the training set data. Embodiments of the present disclosure compare the test data to the data values in the corresponding fields of the previously filled forms of the training set data. Embodiments of the present disclosure generate matching data indicating how closely the test data matches the values in the previously filled forms of the training set data. Embodiments of the present disclosure can identify, for each selected data field, one or more of the highly ranked candidate functions as acceptable candidate functions. An acceptable candidate function can include a candidate function that produces test data that exactly matches the training set data. Alternatively, an acceptable candidate function can include a candidate function that produces test data that matches the training set data within an acceptable error tolerance.

Embodiments of the present disclosure can generate results data that indicates the acceptable candidate functions for each data field of the new form. Embodiments of the present disclosure can output the results data for review by experts who can review and approve the correct functions. Additionally, or alternatively, embodiments of the present disclosure can determine when an acceptable candidate function has been found or when the new form has been entirely learned and can incorporate the new form into a user document preparation engine so that users or customers of the electronic document preparation system can utilize the electronic document preparation system to electronically prepare documents using the new form. By utilizing multiple analysis techniques to learn and incorporate new forms, efficiency of the electronic document preparation system is increased.

Embodiments of the present disclosure can include as analysis modules, two or more of a machine learning module, a natural language parsing module, and a historical instructions analysis module. Embodiments of the present disclosure can include other types of analysis modules than those listed above, as will be apparent to those of skill in the art in light of the present disclosure. All such other analysis modules and analysis techniques fall within the scope of the present disclosure.

In addition, the disclosed method and system for learning and incorporating new forms in an electronic document preparation system provides for significant improvements to the technical fields of electronic document preparation, data processing, data management, and user experience.

In addition, as discussed above, the disclosed method and system for learning and incorporating new forms in an electronic document preparation system provide for the processing and storing of smaller amounts of data, i.e., more efficiently acquire and analyze forms and data; thereby eliminating unnecessary data analysis and storage. Consequently, using the disclosed method and system for learning and incorporating new forms in an electronic document preparation system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for learning and incorporating new forms in an electronic document preparation system.

The production environment 100 includes a service provider computing environment 110, user computing environment 140, third party computing environment 150, and public information computing environment 160, for learning and incorporating new forms in an electronic document preparation system, according to one embodiment. The computing environments 110, 140, 150, and 160 are communicatively coupled to each other with one or more communication channels 101, according to one embodiment.

The service provider computing environment 110 represents one or more computing systems such as a server, a computing cabinet, and/or distribution center that is configured to receive, execute, and host one or more electronic document preparation systems (e.g., applications) for access by one or more users, for learning and incorporating new forms in an electronic document preparation system, according to one embodiment. The service provider computing environment 110 represents a traditional data center computing environment, a virtual asset computing environment (e.g., a cloud computing environment), or a hybrid between a traditional data center computing environment and a virtual asset computing environment, according to one embodiment.

The service provider computing environment 110 includes an electronic document preparation system 111, which is configured to provide electronic document preparation services to a user.

According to one embodiment, the electronic document preparation system 111 can be a system that assists in preparing financial documents related to one or more of tax return preparation, invoicing, payroll management, billing, banking, investments, loans, credit cards, real estate investments, retirement planning, bill pay, and budgeting. The electronic document preparation system 111 can be a tax return preparation systems or other type of electronic document preparation system. The electronic document preparation system 111 can be a standalone system that provides financial document preparation services to users. Alternatively, the electronic document preparation system 111 can be integrated into other software or service products provided by a service provider.

The electronic document preparation system 111 assists users in preparing documents related to one or more forms that include data fields to be completed by the user. The data fields request data entries in accordance with specified functions. Once the electronic document preparation system has learned the functions that produce the requested data entries for the data fields, the electronic document preparation system can assist individual users in electronically completing the form.

In many situations, such as in tax return preparation situations, state and federal governments or other financial institutions issue new or updated versions of standardized forms each year or even several times within a single year. Each time a new form is released, the electronic document preparation system 111 may need to learn the specific functions that provide the requested data entries for each data field in the new form. If these data fields are not correctly completed, there can be serious financial consequences for users. Furthermore, if the electronic document preparation system 111 does not quickly learn and incorporate new forms into the electronic document preparation system 111, users of the electronic document preparation system 111 may turn to other forms of financial document preparation services. In traditional electronic document preparation systems, new forms are learned and incorporated by financial professionals and/or experts manually reviewing the new forms and manually revising software instructions to incorporate the new forms. In some cases, this can be a slow, expensive, and unreliable system. Thus, the electronic document preparation system 111 in accordance with principles of the present disclosure advantageously utilizes multiple analysis techniques in conjunction with training set data in order to quickly and efficiently learn the functions related to each data field of a form and incorporate them into the electronic document preparation system 111. The use of multiple analysis techniques helps to ensure that accurate candidate functions are found.

In one embodiment, the electronic document preparation system 111 includes a user interface module 112, a form analysis module 113, a natural language parsing module 114, a historical instructions analysis module 115, a machine learning module 116, a data acquisition module 117, and an evaluator module 118.

The interface module 112 is configured to receive form data 121 related to a new form. The interface module 112 can receive the form data 121 from an expert, from a government agency, from a financial institution, or in other suitable ways. According to one embodiment, when a new form or new version of a form is released, an expert or other personnel of the electronic document preparation system 111 can upload an electronic version of the form to the interface module 112. The interface module 112 can also receive the form data in an automated manner such as by receiving automatic updates or in another way.

In one embodiment, a new form can include any form to be analyzed by the electronic document preparation system 111. In one embodiment, the new form may be new in the sense that it is a form that has been produced or released very recently. In one embodiment, the new form may also be new in the sense that it has not been previously analyzed by the by the electronic document preparation system 111, even though the new form was not recently produced or released. In one embodiment, the new form can also be any form that will be analyzed by the electronic document preparation system 111 for any reason. In one embodiment, the new form can include a form that has been previously analyzed and/or incorporated by the electronic document preparation system 111 and that will be analyzed anew. In some cases, there is doubt as to whether the new form has been previously incorporated into the system and thus the new form may or may not have been previously analyzed or incorporated by the electronic document preparation system 111.

In one embodiment, the form data 121 may be in a visual form such as a PDF or in another format that does not readily enable cataloging of the individual data fields and corresponding context data of the new form. Accordingly, the electronic document preparation system 111 includes a form analysis module 113 that is configured to analyze the form data 121 and generates structured form data 119. The structured form data 119 can include data related the data fields, limiting values, tables, dependencies, variables, text descriptions, or other data related to the new form and its data fields.

The interface module 112 can also output results data 122 indicating the results of an analysis and evaluation process for finding acceptable candidate functions for the various data fields. The interface module 112 can also output learned form data related to the finalized learned functions of the new form. An expert can obtain and review the results data 122 and the learned form data from the interface module 112. Results data 122 or other test data can also be utilized by an expert and/or an automated system to use for other purposes. For example: results data 122 or other test data can be used by electronic document preparation systems to test software instructions of the electronic document preparation system before making functionality associated with the software instructions available to the public.

In one embodiment, the natural language parsing module 114 is an analysis module that utilizes natural language parsing analysis techniques in order to generate natural language parsing data 123 and candidate function data 124.

In one embodiment, the natural language parsing module 114 performs natural language parsing analysis on the structured form data 119. The structured form data 119 may include text description or other context data related to each data field. The natural language parsing module 114 generates natural language parsing data 123 by performing natural language parsing analysis on the context data related to a selected data field of the structured form data 119. The natural language parsing module 114 can identify the words used in the structured form data 119 to describe the proper function for generating a data value for the selected data field. The natural language parsing module 114 can identify keywords in the context data that describe operators such as "add", "sum", "subtract", "multiply", "divide", "combine", "if", "then", "else", "greater", "lesser", "maximum", "minimum", or other words that suggest operators or relationships between dependencies or variables. The natural language parsing module 114 can also identify keywords that denote dependencies, variables, or other factors in a correct function for providing the data value in the selected data field. For example, the natural language parsing module 114 can identify when data values from other lines or data fields are referenced in the context of the selected data field. The natural language parsing module 114 can identify when other forms or data fields from other forms are being referenced in the context of the selected data field. The natural language parsing module 114 can analyze the relationships between the operators and dependencies in order to generate one or more candidate functions for the selected data field.

In one embodiment, the natural language parsing module 114 generates candidate function data 124 that includes the one or more candidate functions based on a natural language parsing analysis of the context data related to the selected data field. In some cases, the candidate function data may include only a single candidate function. In other cases, ambiguities in the context data may cause the natural language parsing module 114 to generate multiple candidate functions for the selected data field.

In one example, the electronic document preparation system 111 is learning an appropriate function for line 5 of a new tax form. The text in the tax form related to line 5 says "This value is the lesser of $6000 and the sum of line 3 and line 4." The natural language parsing module 114 generates natural language parsing data 123 by analyzing the text related to line 5. The natural language parsing module identifies keywords such as the constant "6000", the relationship indicator "lesser", the operator "sum", and the dependencies "line 3" and "line 4". From these keywords and other knowledge of the syntax of English sentences, the natural language parsing module 114 generates one or more candidate functions for line 5 of the new tax form.

In one embodiment, the natural language parsing module 114 can use natural language parsing techniques such as semantic parsing in order to determine dependencies, operators, syntax, and relationships between the dependencies and operators in order to generate candidate functions. The natural language parsing module 114 then generates one or more candidate functions based on the natural language parsing analysis of the context data related to the selected data field.

In one embodiment, when the natural language parsing module 114 has generated candidate function data 124 including one or more candidate functions for the selected data field of a new form, the natural language parsing module 114 passes the candidate function data 124 to the evaluator module 118.

In one embodiment, the natural language parsing module 114 can improve in accuracy based on feedback from the evaluator module 118. For example, when the evaluator module 118 indicates that one or more candidate functions are acceptable or not acceptable, the natural language parsing module can learn and increase the accuracy of the natural language parsing analysis for future analyses based on the feedback from the evaluator module 118. Additionally, or alternatively, the natural language parsing module 114 can receive feedback, updates, revisions, etc. from systems other than the evaluator module 118, or even from experts that help maintain the electronic document preparation system 111.

Those of skill in the art will recognize, in light of the present disclosure, that the natural language parsing module 114 can utilize many other natural language parsing techniques than those described herein. All such other natural language parsing analysis techniques fall within the scope of the present disclosure.

In one embodiment, the historical analysis module 115 is an analysis module that utilizes a historical instructions analysis technique to generate candidate functions for a selected data field of the new form.

In one embodiment, the electronic document preparation system 111 has access to historical electronic document preparation systems that previously generated data values for data fields of historical forms that are related to the new form. The historical electronic document preparation system can include previous versions of the historical document preparation system 111. The historical electronic document preparation system includes software instructions for calculating the data values of data fields of various forms, including forms related to the new form. By analyzing the previous functions used by the historical electronic document preparation system for generating data values for a data field corresponding to the selected field of the new form, the historical instructions analysis module 115 can generate one or more candidate functions for the selected data field of the new form.

In one embodiment, the historical instructions analysis module 115 analyzes the software instructions and generates the historical document instruction data 125. The historical document instructions data 125 can include dependency data that identifies one or more dependencies used by the historical electronic document preparation system in calculating data values for a data field of a previous form related to the selected data field of the new form. The historical document instructions data 125 can also indicate operators and relationships between the dependencies.

In one embodiment, the historical instructions analysis module 115 generates candidate function data 126 indicating one or more candidate functions for the selected data field of the new form. In one embodiment, the historical instructions analysis module 115 may generate candidate function data 126 that includes a candidate function that is identical to a function used in the historical software instructions for generating a data value for a data field in a previous form related to the new form. Alternatively, or additionally, the historical instructions analysis module 115 may generate candidate function data 126 that includes more than one candidate functions due to inability to decisively determine the function used in the historical software instructions.

In one embodiment, the historical instructions analysis module 115 generates an abstract syntax tree when analyzing the historical software instructions related to the historical electronic document preparation system. The historical instructions analysis module 115 can generate historical document instructions data 125 by parsing the abstract syntax tree. The parsing of the abstract syntax tree can provide dependency data related to dependencies in the function for generating the data value in the data field of the historical form related to the new form. The parsing of the abstract syntax tree can also result in one or more candidate functions to be included in the candidate function data 126.

Those of skill in the art will recognize, in light of the present disclosure, that the historical instructions analysis module 115 can utilize many other historical instruction analysis techniques than those described herein. All such other historical instructions analysis techniques fall within the scope of the present disclosure.

In one embodiment, after the historical instructions analysis module 115 has generated candidate function data 126 including one or more candidate functions, the historical instructions analysis module 115 provides the candidate function data to the evaluator module 118.

In one embodiment, the machine learning module 116 is an analysis module that uses machine learning analysis techniques to generate candidate functions for the selected data field of the new form.

In one embodiment, the machine learning module 116 generates a large number of candidate functions based on dependency data that includes dependencies related to the selected data field. The machine learning module 116 can receive dependency data from the historical instructions analysis module 115, the natural language parsing module 114, or the form analysis module 113. The machine learning module 116 utilizes the dependency data to generate candidate functions as part of a machine learning process to generate more accurate candidate functions.

In one embodiment, the machine learning module 116 generates machine learning data 127. The machine learning module 116 utilizes the machine learning data 127 to generate a plurality of candidate functions 128.

In one embodiment, the machine learning module 116 generates candidate functions for the selected data field based on the dependency data and one or more operators from a superset of operators. Thus, the candidate functions generated by the machine learning module 116 can include dependencies from the dependency data and operators from a superset of operators.

In one embodiment, the machine learning module 116 utilizes training set data 129 to test the candidate functions. In particular, the machine learning module 116 generates a plurality of candidate functions, generates test data for each candidate function by applying the candidate function to the training set data, then compares the test data to the training set data in order to determine which of the candidate functions are most accurate. The machine learning module 116 can continue generating additional candidate functions for the selected data field until one or more candidate functions is found that matches the training set data 129 within a threshold error tolerance.

In one embodiment, the machine learning module 116 is able generate and test thousands of candidate functions very rapidly in successive iterations. The machine learning module 116 can utilize one or more algorithms to generate candidate functions based on many factors. The machine learning module 116 can generate new candidate functions based on previously tested candidate functions. The machine learning module 116 can utilize analysis of the structured the form data 119, the historical document instruction data 125, the natural language parsing data 123, and/or other data to learn the likely dependencies/components of the correct function for a particular data field and can generate candidate functions based on these likely components.

In one embodiment, the electronic document preparation system 111 uses the data acquisition module 117 to acquire the training set data 129. The training set data 129 includes previously prepared documents for a large number of previous users of the electronic document preparation system 111 or fictitious users of the electronic document preparation system 111. The training set data 129 can be used by the machine learning module 116 and the evaluator module 118 in order to learn and incorporate the new form into the electronic document preparation system 111.

In one embodiment, the training set data 129 can include historical data 130 related to previously prepared documents or previously filled forms of a large number of users. The historical data 130 can include, for each of a large number of previous users of the electronic document preparation system 111, a respective completed copy of the new form or a completed copy of a form related to the new form. The completed copies of the form include data values in the data fields.

In one embodiment, the training set data 129 can include fabricated data 131. The fabricated data 131 can include copies of the new form that were previously filled using fabricated data. The fabricated data can include real data from previous users or other people but that has been scrubbed of personal identifiers or otherwise altered.

In one embodiment, the historical data 130 and/or the fabricated data 131 also includes all of the related data used to complete the forms and to prepare the historical document. The historical data 130 can include previously prepared documents that include or use the completed form and which were filed with and/or approved by a government or other institution. In this way, the historical data 130 can be assured in large part to be accurate and properly prepared, though some of the data related to the previously prepared documents may include errors. Typically, the functions for computing or obtaining the proper data entry for a data field of a form can include data values from other forms resources related to each other and sometimes complex ways. Thus, the historical data 130 can include, for each historical user in the training set data, a final version of a previously prepared document, the form that is related to the new form to be learned, other forms used to calculate the values for the related form, and other sources of data for completing the related form.

In one embodiment, the electronic document preparation system 111 is a financial document preparation system. In this case, the historical data 130 can include historical financial data. The historical financial data can include, for each historical user of the electronic document preparation system 111, information, such as, but not limited to, a name of the user, a name of the user's employer, an employer identification number (EID), a job title, annual income, salary and wages, bonuses, a Social Security number, a government identification, a driver's license number, a date of birth, an address, a zip code, home ownership status, marital status, W-2 income, an employer's address, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial document preparation system or in the preparation of financial documents such as a user's tax return, according to various embodiments.

In one embodiment, the data acquisition module 117 is configured to obtain or retrieve historical data 130 from a large number of sources. The data acquisition module 117 can retrieve, from databases of the electronic document preparation system 111, historical data 130 that has been previously obtained by the electronic document preparation system 111 from a plurality of third-party institutions. Additionally, or alternatively, the data acquisition module 117 can retrieve the historical data 130 afresh from the third-party institutions.

In one embodiment, the data acquisition module 117 can also supply or supplement the historical data 130 by gathering pertinent data from other sources including the third party computing environment 150, the public information computing environment 160, the additional service provider systems 137, data provided from historical users, data collected from user devices or accounts of the electronic document preparation system 111, social media accounts, and/or various other sources to merge with or supplement historical data 130, according to one embodiment.

The data acquisition module 117 can gather additional data including historical financial data and third party data. For example, the data acquisition module 117 is configured to communicate with additional service provider systems 137, e.g., a tax return preparation system, a payroll management system, or other electronic document preparation system, to access financial data 136, according to one embodiment. The data acquisition module 117 imports relevant portions of the financial data 136 into the electronic document preparation system 111 and, for example, saves local copies into one or more databases, according to one embodiment.

In one embodiment, the additional service provider systems 137 include a personal electronic document preparation system, and the data acquisition module 117 is configured to acquire financial data 136 for use by the electronic document preparation system 111 in learning and incorporating the new or updated form into the electronic document preparation system 111. Because the services provider provides both the electronic document preparation system 111 and, for example, the additional service provider systems 137, the service provider computing environment 110 can be configured to share financial information between the various systems. By interfacing with the additional service provider systems 137, the data acquisition module 117 can supply or supplement the historical data 130 from the financial data 136. The financial data 136 can include income data, investment data, property ownership data, retirement account data, age data, data regarding additional sources of income, marital status, number and ages of children or other dependents, geographic location, and other data that indicates personal and financial characteristics of users of other financial systems, according to one embodiment.

The data acquisition module 117 is configured to acquire additional information from various sources to merge with or supplement the training set data 129, according to one embodiment. For example, the data acquisition module 117 is configured to gather from various sources historical data 130. For example, the data acquisition module 117 is configured to communicate with additional service provider systems 137, e.g., a tax return preparation system, a payroll management system, or other financial management system, to access financial data 136, according to one embodiment. The data acquisition module 117 imports relevant portions of the financial data 136 into the training set data 129 and, for example, saves local copies into one or more databases, according to one embodiment.

The data acquisition module 117 is configured to acquire additional financial data from the public information computing environment 160, according to one embodiment. The training set data can be gathered from public record searches of tax records, public information databases, property ownership records, and other public sources of information. The data acquisition module 117 can also acquire data from sources such as social media websites, such as Twitter, Facebook, LinkedIn, and the like.

The data acquisition module 117 is configured to acquire data from third parties, according to one embodiment. For example, the data acquisition module 117 requests and receives third party data 126 from the third party computing environment 150 to supply or supplement the training set data 129, according to one embodiment. In one embodiment, the third party computing environment 150 is configured to automatically transmit financial data to the electronic document preparation system 111 (e.g., to the data acquisition module 117), to be merged into training set data 129. The third party computing environment 150 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one embodiment, the electronic document preparation system 111 utilizes the machine learning module 116 to generate candidate functions in conjunction with training set data 129. The machine learning module 116 generates a plurality of candidate functions for each data field of the new form to be learned and applies the candidate functions to the training set data 129 in order to find candidate functions that produces data values that more closely within a threshold error tolerance match the corresponding data values in the completed data fields of the training set data 129. The machine learning module 116 can continue to generate new candidate functions until the machine learning module 116 finds a candidate function that, when applied to the training set data 129, produces data values that match the data values in the completed data fields of the training set data 129.

In one embodiment, the dependency data utilized by the machine learning module 116 can include possible dependencies such as one or more data values from other data fields of the new form, one or more data values from another related form or worksheet, one or more constants, or many other kinds of possible dependencies that can be included in a correct function for a particular data field.

In one embodiment, the machine learning module 116 generates candidate functions based on the dependency data 129 and one or more operators selected from a set or superset of operators. The operators can include arithmetic operators such as addition, subtraction, multiplication, or division operators. The operators can include logical operators such as if-then operators. The operators can include existence condition operators that depend on the existence of a data value in another data field of new form, in a form other than the new form, or in some other location or data set. The operators can include string comparisons. Each candidate function can include one or more of the operators operating on one or more of the possible dependencies.

In one embodiment, when the machine learning module 116 has generated candidate function data 128 including one or more candidate functions, the machine learning module 116 provides the candidate function data 128 to the evaluator module 118. In one embodiment, the machine learning module 116 only passes to the evaluator module 118 a selected number of the candidate functions that most closely match the training set data 129. In some cases, the machine learning module 116 may pass only a single candidate function to the evaluator module 118. In one embodiment, the machine learning module 116 may provide candidate function data 128 that includes a large number of candidate functions to the evaluator module 118.

In one embodiment, the machine learning module 116 utilizes one or more algorithms, analysis techniques, or processes that can assist in the machine learning process for generating candidate functions for the selected data field. In one embodiment, the machine learning module 116 utilizes genetic programming techniques as part of the machine learning process. In one embodiment, the machine learning module 116 utilizes genetic algorithms in the machine learning process.

Those of skill in the art will recognize, in light of the present disclosure, that the machine learning module 116 can utilize many other types of machine learning analysis techniques other than those described above. All such other machine learning analysis techniques fall within the scope of the present disclosure.

In one embodiment, the electronic document preparation system 111 utilizes the evaluator module 118 to evaluate the candidate function is generated by each of the natural language parsing module 114, the historical instructions analysis module 115, and the machine learning module 116. The evaluator module 118 can evaluate, for each selected data field of the new form, which of the candidate functions is an acceptable candidate function.

In one embodiment, the evaluator module 118 receives candidate function data 124 from the natural language parsing module 114, candidate function data 126 from the historical instructions analysis module 115, and candidate function data 128 from the machine learning module 116. Each of the candidate function data 124, 126, and 128 can include one or more candidate functions. The candidate function data 124 can include a first set of candidate functions generated by the natural language parsing module 114. The candidate function data 126 can include a second set of candidate functions generated by the historical instructions analysis module 115. The candidate function data 128 can include a third set of candidate functions generated by the machine learning module 116. Each set of candidate functions can include one or more candidate functions.

In one embodiment, the evaluator module 118 generates combined candidate function data 132 by combining the candidate function data 124, the candidate function data 126, and the candidate function data 128. Thus, the combined candidate function data 132 includes candidate functions from each of the natural language parsing module 114, the historical instructions analysis module 115, and the machine learning module 116.

In one embodiment, the evaluator module 118 evaluates the accuracy of each of the candidate functions in the combined candidate function data 132. In particular, the evaluator module 116 generates test data 133 for each candidate function in the combined candidate function data 132. In particular, the evaluator module 118 generates the test data 133 by applying each candidate function to the training set data 129. In other words, for a selected data field of the new form, the evaluator module 118 generates test data 133 by retrieving the data values from the training set data 129 that correspond to the dependencies in the candidate functions and generates test data values by plugging the dependencies into the candidate functions. The dependencies can include constants, values from other data fields in the previously prepared forms, values from data fields in other forms, values from data fields in worksheets used to prepare the previously filled forms, or other kinds of dependencies. Thus, the evaluator module 118 generates test data by pulling data values from the training set data 129 that correspond to the dependencies in the candidate functions and plugging them into the candidate functions.

In one embodiment, the evaluator module 118 generates matching data 134 for each candidate function by comparing the test data 133 to the training set data 129. In particular, the test data 133 will include, for each candidate function, a test value. The evaluator module 118 generates matching data 134 by comparing the test values in the test data 133 to the data values in the data fields of the previously filled forms that correspond to the selected data field of the new form for which the candidate functions were generated. The matching data 134 indicates, for each candidate function, how closely the test values of the test data 133 match the data values in the data field of the previously filled forms that corresponds to the selected data field in the new form.

In one embodiment, the evaluator module 118 generates ranking data 135 that ranks each of the candidate functions based on how well the respective test data 133 matches the training set data 129. In particular, the matching data 134 lists each candidate function in order of how accurate the candidate function is. The accuracy of the candidate function indicates how well the test data generated by the candidate function matched the training set data 129.

In one embodiment, generating ranking data 134 includes generating accuracy scores based on the matching data 134. The accuracy scores can include scores between 0 and 1 and can also include an indicator of which analysis module or analysis techniques were used to generate the scores.

In one embodiment, the evaluator module 118 can select one or more of the most highly ranked candidate functions as acceptable candidate functions for the selected data field. In one embodiment, the evaluator module 118 selects only the highest ranked candidate function as an acceptable candidate function. Alternatively, the evaluator module 118 can select multiple candidate functions as being acceptable candidate functions for the selected data field. In one embodiment, the evaluator module 118 only selects a candidate function as an acceptable candidate function if it's test data 133 matches the training set data 129 within a threshold error tolerance.

In one embodiment, the evaluator module 118 generates results data 122 that indicates one or more of the ranking data 135 and any candidate functions that are selected as acceptable candidate functions. The results data 122 can include the list of all ranked candidate functions. Alternatively, the results data 122 may include only selected number of the highest ranked candidate functions. Alternatively, the results data 122 can include only results data having test data 133 that matches the training set data 129 within a threshold error.

In one embodiment, it is possible that one or more of the analysis modules will not provide a candidate function for a selected data field of the new form. In this case, the evaluator module will still rank the available candidate functions and determine if one or more of the candidate functions is an acceptable candidate function.

In one embodiment, the form analysis module 113 can compare the structured form data 119 to the historical structured form data to determine if the description or context data related to a selected data field of the new form is identical to the description or context data related to a corresponding data field in a previous version of the form. If the description or context data related to the selected data field of the new form is not identical to the description or context data related to the corresponding data field in the previous version of the form, then the evaluator module 118 can discard candidate functions from the machine learning module 116 and the historical instructions analysis module 115. In this case, the ranking data 135 includes only solutions from the natural language parsing module 114. If the description or context data related to the selected field of the new form is identical to the description or context data related to the corresponding data field in the previous version of the form, then the evaluator module 118 ranks all of the candidate functions from all the analysis modules.

In one embodiment, if two or more candidate functions have identical rankings, then the evaluator module 118 can give priority to candidate functions generated by one of the analysis modules over candidate functions generated by the other analysis modules. For example, the evaluator may give priority to candidate functions generated by the natural language parsing module 114 over candidate functions generated by the historical instructions analysis module 115 and the machine learning module 116. The evaluator module 118 may also give priority to candidate functions generated by the historical instructions analysis module 115 over candidate functions generated by the machine learning module 116.

In one embodiment, the evaluator module 118 identifies acceptable functions for the selected data fields of the new form one at a time. In other words, if the form data 121 indicates that a form has 10 data fields to be learned, the evaluator module 118 will begin by learning the correct function for a first data field of the new form. The first data field is not necessarily the data field that appears first in the form. In particular, the evaluator module 118 will cause a machine learning module 116, the historical instructions analysis module 115, and the natural language parsing module 114 to each generate candidate function data including one or more candidate functions for the first data field of the new form. The evaluator module 118 will generate combined function data 132 from the candidate function data 124, 126, and 128. The evaluator module 118 will then generate test data 133, matching data 134, and ranking data 135 for the first data field as described previously. The evaluator module 118 will determine one or more acceptable functions for the first data field. The evaluator module 118 will then cause the natural language parsing module 114, the historical instructions analysis module 115, and the machine learning module 116 to generate candidate function data 124, 126 and 128 each including one or more candidate functions for a second data field of the new form. The evaluator module 118 will again generate combined candidate function data 132, test data 133, matching data 134, and ranking data 135. The evaluator module 118 will select one or more candidate functions as acceptable functions for the second data field of the new form. The evaluator module 118 will continue in this manner until all respective accepted candidate functions have been found for each data field of the new form.

It is expected that the training set data 129 may include some errors in the completed data values for the data field under test. Thus, an acceptable function may result in test data 133 that does not perfectly match the completed data fields in the training set data 129. Thus, the correct candidate function will result in test data that matches the training set data within an error tolerance.

In one embodiment, the evaluator module 118 generates confidence score data 122 based on the matching data 134. The confidence score data can indicate, for each candidate function, how confident the machine learning module 116 is that the candidate function is a correct function. The confidence score data can be based on the matching data 134 and recurrence data.

In one embodiment, the evaluator module 118 generates results data 122. The results data 122 can include matching data 134 and/or confidence score data for each candidate function that has been tested for particular data field of the new form to be learned. Alternatively, the results data 122 can include data indicating that one or more of the candidate functions is possibly correct based on the matching data 134 and/or the confidence score. Alternatively, the results data 122 can indicate that an acceptable candidate function has been found. The results data 122 can also indicate what the acceptable candidate function is. The results data 122 can be provided to the interface module 112. The interface module 112 can output the results data 122 to an expert or other personnel for review and/or approval.

In one embodiment, the evaluator module 118 outputs results data 122 indicating that a candidate function has been found that is likely correct. The results data 122 can indicate what the candidate function is, the matching data 134 or confidence score data related to the candidate function, or any other information that will be useful for review by an expert. The evaluator module 118 can cause the interface module 112 to prompt an expert to review the results data 122 and to approve the candidate function as acceptable or to indicate that the candidate function is not acceptable and that the analysis modules should continue generating candidate functions for the data field currently under test. The evaluator module 118 awaits input from the expert or other personnel approving the candidate function. If the candidate function is approved by the expert or other personnel, the evaluator module 118 determines that an acceptable function has been found and moves on to finding an acceptable candidate function the next data field of the new form.

In one embodiment, the evaluator module 118 does not wait for the approval of an expert before determining that the correct candidate function test and found. Instead, when the evaluator module 118 determines that an acceptable function has been found based on the matching data, the confidence score data, and/or other criteria, the evaluator module 118 moves onto the next data field of the new form under test.

In one embodiment, when the evaluator module 118 has learned an acceptable function for each data field of the new form, then the evaluator module 118 generates learned form data. The learned form data indicates that the new form has been learned. The learned form data can also indicate what the acceptable functions are for each of the data fields of the new form. The interface module 112 can output the learned form data for review and/or approval by expert. In one embodiment, once the expert or other personnel has approved the learned form data, the evaluator module 118 ceases analysis of the new form and awaits form data 121 related to another form to be learned.

In one embodiment, the user computing environment 140 is a computing environment related to a user of the electronic document preparation system 111. The user computing environment 140 includes input devices 141 and output devices 142 for communicating with the user, according one embodiment. The input devices 141 include, but are not limited to, keyboards, mice, microphones, touchpads, touchscreens, digital pens, and the like. The output devices 142 include, but are not limited to, speakers, monitors, touchscreens, and the like. The output devices 142 can display data related to the preparation of the financial document.

In one embodiment, the electronic document preparation system 111 is a tax return preparation system. Preparing a single tax return can require many government tax forms, many internal worksheets use by the tax return preparation system in preparing a tax return, W-2 forms, and many other types of forms or financial data pertinent to the preparation of a tax return preparation system. For each tax return that is prepared for a user, the tax return preparation system maintains copies of all of the various tax forms, internal worksheets, data provided by the user and any other relevant financial data used to prepare the tax return. Thus, the tax return preparation system maintains historical tax return data related to millions of previously prepared tax returns. The tax return preparation system can utilize the historical tax return data to gather or generate relevant training set data 129 that can be used by the evaluator module 118.

In one embodiment, a state or federal agency releases a new tax form that is simply a new version of a previous tax form during tax return preparation season. an expert upload form data 121 to the interface module 112. The form data 121 corresponds to an electronic version of the new tax form. Many or all of the data fields of the new tax form may be similar to those of the previous tax form. The evaluator module 118 begins to learn the new tax form starting with a first selected data field of the new tax form. The first selected data field corresponds to a first selected line of the new tax form, not necessarily line 1 of the new tax form. The evaluator module 118 causes the data acquisition module 117 to gather training set data 129 that includes a large number of previously prepared tax returns and the tax related data associated with the previously prepared tax returns. In particular, the training set data 129 will include previously prepared tax returns that use the previous version of the new form. The evaluator module 118 generates a plurality of candidate functions for the first selected data field and applies them to the training set data 129. For each candidate function, the machine learning module generates matching data 134 and/or confidence score data indicating how well the test data 133 matches the training set data 129. The evaluator module 118 generates results data 122 indicating the matching data 134 and/or the confidence score data of one or more of the candidate functions. The results data 122 can also indicate whether a candidate function is deemed to be an acceptable function for the first selected data field.

The evaluator module 118 moves onto a second selected data field after an acceptable function has been found for the first selected data field. The data fields correspond to selected lines of the new tax form. The evaluator module 118 continues in this manner until all selected data fields of the new tax form have been found. When all selected data fields of the new tax form have been learned, the evaluator module 118 generates learned form data indicating that all selected fields of the new form have been learned. The interface module 112 can present results data 122 or learned form data for review and/or approval by an expert or other personnel. Alternatively, the evaluator module 118 can move from one data field to the next data field without approval or review by an expert.

Embodiments of the present disclosure address some of the shortcomings associated with traditional electronic document preparation systems that do not adequately learn and incorporate new forms into the electronic document preparation system. An electronic document preparation system in accordance with one or more embodiments provides more reliable financial management services by utilizing machine learning and training set data to learn and incorporate new forms into the electronic document preparation system. The various embodiments of the disclosure can be implemented to improve the technical fields of data processing, data collection, resource management, and user experience. Therefore, the various described embodiments of the disclosure and their associated benefits amount to significantly more than an abstract idea. In particular, by utilizing machine learning to learn and incorporate new forms in the electronic document preparation system, electronic document preparation system can more efficiently learn and incorporate new forms into the electronic document preparation system.

Process

Figure 2:
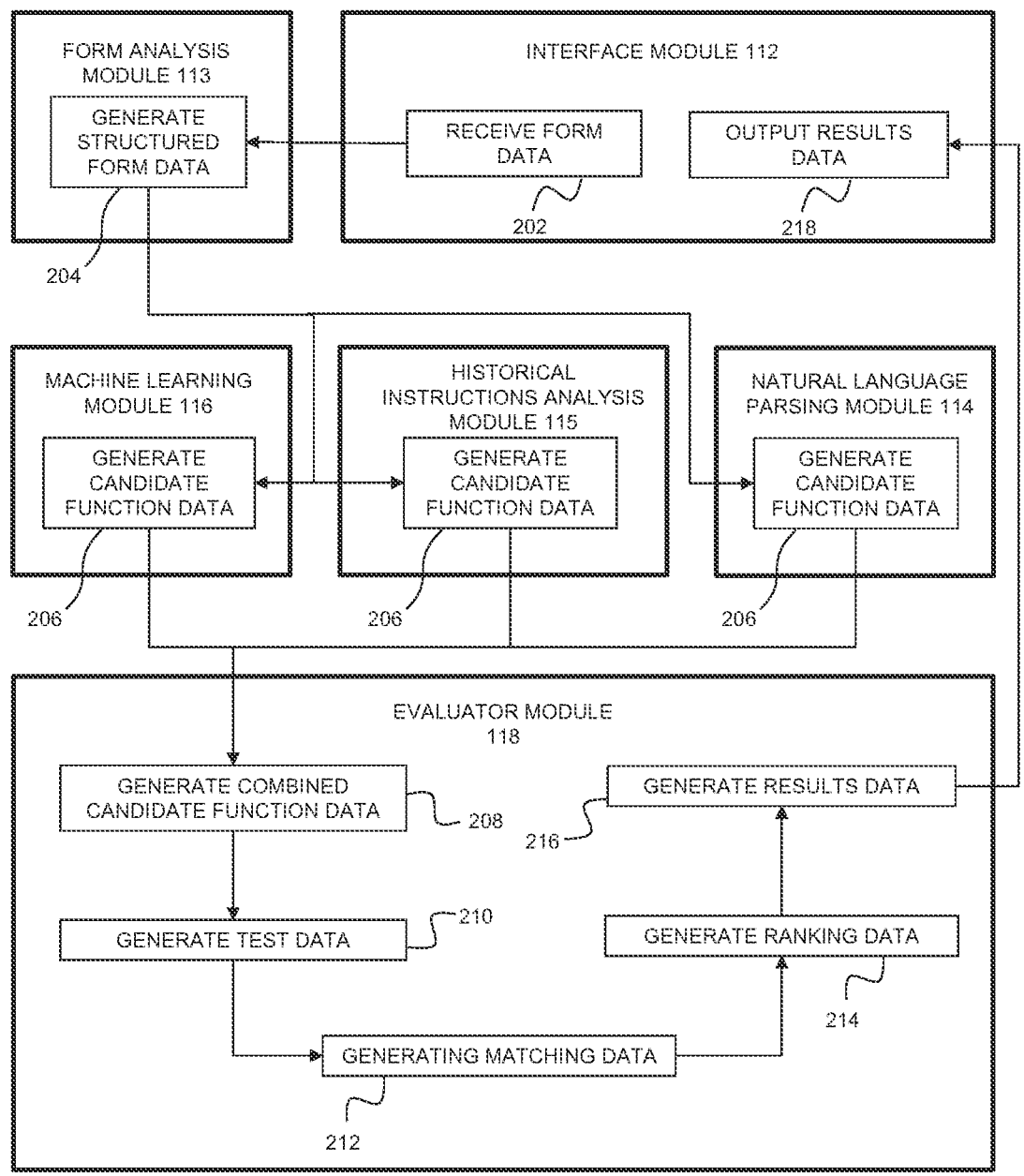
FIG. 2 is a block diagram of a process for learning and incorporating new forms in an electronic document preparation system, in accordance with one embodiment.

FIG. 2 illustrates a functional flow diagram of a process 200 for learning and incorporating new forms in an electronic document preparation system, in accordance with one embodiment.

At block 202 the user interface module 112 generates structured form data by analyzing form data related to a new form having a plurality of data fields, the structured form data identifying the data fields of the new form and context data related to context describing the data fields of the new f that expect data values in accordance with specific functions, according to one embodiment. From block 202 the process proceeds to block 204.

At block 204 the form analysis module 113 generates structured form data from by analyzing and structuring the form data related to the new form, according to one embodiment. From block 204 the process proceeds to blocks 206.

At block 206, the natural language parsing module 114, the historical instructions analysis module 115, and the machine learning module 116 each generate candidate function data including one or more candidate functions for a first selected data field of the new form, according to one embodiment. From block 206 the process proceeds to block 208

At block 208 the evaluation module 118 generates combined candidate function data by combining the candidate function data from the natural language parsing module 114, the historical instructions analysis module 115, and the machine learning module 116, according to one embodiment. From block 208 the process proceeds to block 210.

At block 210 the evaluation module 118 generates test data by applying the candidate functions to training set data including a plurality of previously filled forms each having a data value in a data field that corresponds to the first selected field of the new form, according to one embodiment. From block 210 the process proceeds to block 212.

At block 212 the evaluation module 118 generates matching data indicating how closely the test data for each candidate function matches the training set data, according to one embodiment. From block 212 the process proceeds to block 214.

At block 214, the evaluation module 118 generates ranking data based on the matching data, according to one embodiment. From block 214 the process proceeds to block 216.

At block 216 the evaluation module 118 generates results data indicating one or more acceptable candidate functions for the first selected data field of the new form, according to one embodiment. From block 216 the process proceeds to block 218.

At block 218, the interface module 112 outputs the results data for review by an expert or other personnel, according to one embodiment.

Although a particular sequence is described herein for the execution of the process 200, other sequences can also be implemented. For example, in one embodiment, blocks 206-218 can be repeated for each additional selected data field of the new form until each selected data field of the new form has a corresponding acceptable candidate function.

Figure 3:
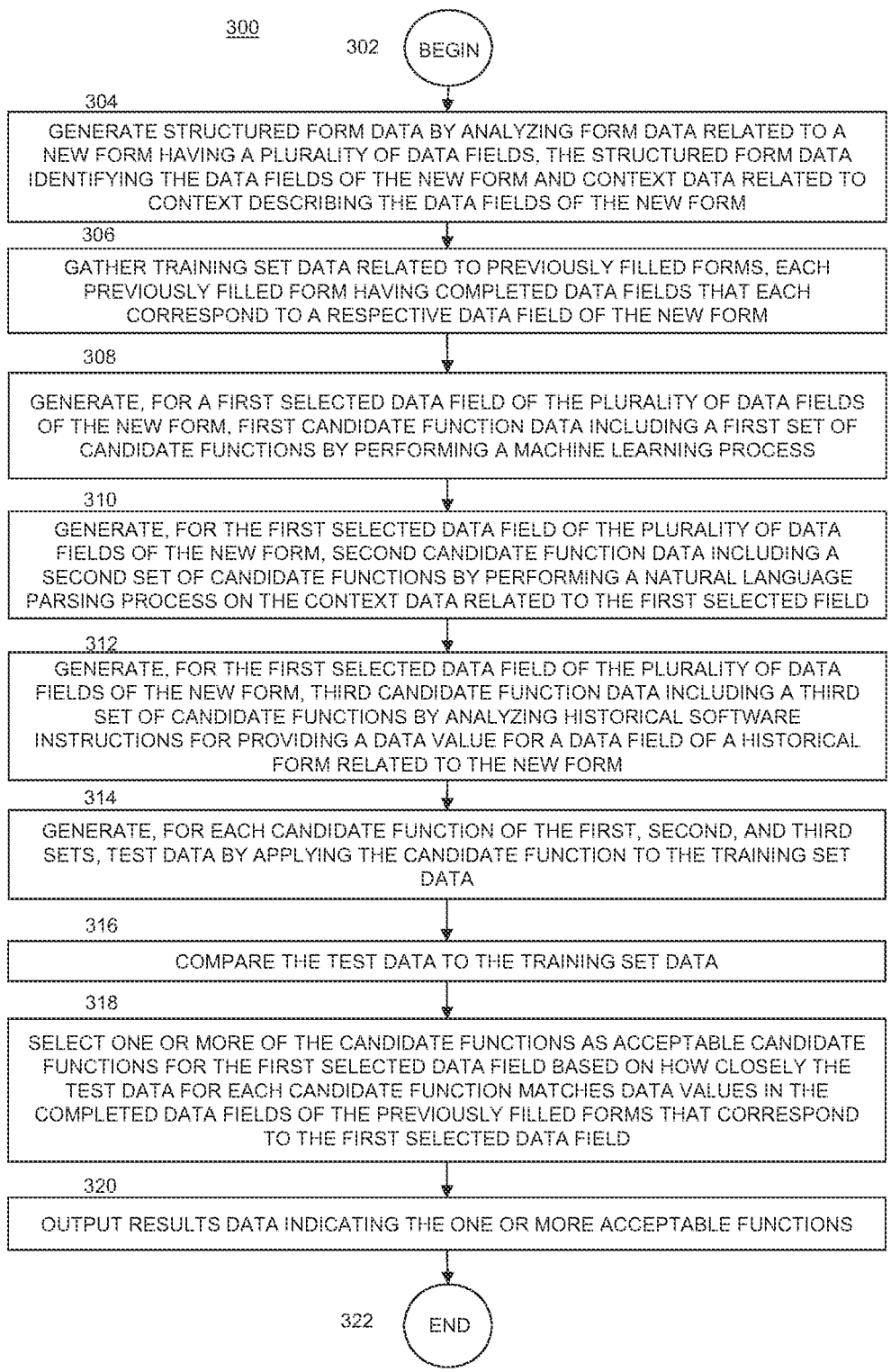
FIG. 3 is a flow diagram of a process for learning and incorporating new forms in an electronic document preparation system, in accordance with one embodiment.

FIG. 3 illustrates a flow diagram of a process 300 for learning and incorporating new forms in an electronic document preparation system, according to various embodiments.

In one embodiment, process 300 for learning and incorporating new forms in an electronic document preparation system begins at BEGIN 302 and process flow proceeds to GENERATE STRUCTURED FORM DATA BY ANALYZING FORM DATA RELATED TO A NEW FORM HAVING A PLURALITY OF DATA FIELDS, THE STRUCTURED FORM DATA IDENTIFYING THE DATA FIELDS OF THE NEW FORM AND CONTEXT DATA RELATED TO CONTEXT DESCRIBING THE DATA FIELDS OF THE NEW FORM 304.

In one embodiment, at GENERATE STRUCTURED FORM DATA BY ANALYZING FORM DATA RELATED TO A NEW FORM HAVING A PLURALITY OF DATA FIELDS, THE STRUCTURED FORM DATA IDENTIFYING THE DATA FIELDS OF THE NEW FORM AND CONTEXT DATA RELATED TO CONTEXT DESCRIBING THE DATA FIELDS OF THE NEW FORM 304 process 300 for learning and incorporating new forms in an electronic document preparation system generates structured form data by analyzing form data related to a new form having a plurality of data fields, the structured form data identifying the data fields of the new form and context data related to context describing the data fields of the new form, according to one embodiment.

In one embodiment, once process 300 for learning and incorporating new forms in an electronic document preparation system generates structured form data by analyzing form data related to a new form having a plurality of data fields, the structured form data identifying the data fields of the new form and context data related to context describing the data fields of the new form at GENERATE STRUCTURED FORM DATA BY ANALYZING FORM DATA RELATED TO A NEW FORM HAVING A PLURALITY OF DATA FIELDS, THE STRUCTURED FORM DATA IDENTIFYING THE DATA FIELDS OF THE NEW FORM AND CONTEXT DATA RELATED TO CONTEXT DESCRIBING THE DATA FIELDS OF THE NEW FORM 304 process flow proceeds to GATHER TRAINING SET DATA RELATED TO PREVIOUSLY FILLED FORMS, EACH PREVIOUSLY FILLED FORM HAVING COMPLETED DATA FIELDS THAT EACH CORRESPOND TO A RESPECTIVE DATA FIELD OF THE NEW FORM 306.

In one embodiment, at GATHER TRAINING SET DATA RELATED TO PREVIOUSLY FILLED FORMS, EACH PREVIOUSLY FILLED FORM HAVING COMPLETED DATA FIELDS THAT EACH CORRESPOND TO A RESPECTIVE DATA FIELD OF THE NEW FORM 306, process 300 for learning and incorporating new forms in an electronic document preparation system gathers training set data related to previously filled forms, each previously filled form having completed data fields that each correspond to a respective data field of the new form, according to one embodiment.

In one embodiment, once process 300 for learning and incorporating new forms in an electronic document preparation system gathers training set data related to previously filled forms, each previously filled form having completed data fields that each correspond to a respective data field of the new form at GATHER TRAINING SET DATA RELATED TO PREVIOUSLY FILLED FORMS, EACH PREVIOUSLY FILLED FORM HAVING COMPLETED DATA FIELDS THAT EACH CORRESPOND TO A RESPECTIVE DATA FIELD OF THE NEW FORM 306, process flow proceeds to GENERATE, FOR A FIRST SELECTED DATA FIELD OF THE PLURALITY OF DATA FIELDS OF THE NEW FORM, FIRST CANDIDATE FUNCTION DATA INCLUDING A FIRST SET OF CANDIDATE FUNCTIONS BY PERFORMING A MACHINE LEARNING PROCESS 308.

In one embodiment, at GENERATE, FOR A FIRST SELECTED DATA FIELD OF THE PLURALITY OF DATA FIELDS OF THE NEW FORM, FIRST CANDIDATE FUNCTION DATA INCLUDING A FIRST SET OF CANDIDATE FUNCTIONS BY PERFORMING A MACHINE LEARNING PROCESS 308, process 300 for learning and incorporating new forms in an electronic document preparation system generates, for a first selected data field of the plurality of data fields of the new form, first candidate function data including a first set of candidate functions by performing a machine learning process, according to one embodiment.

In one embodiment, once process 300 for learning and incorporating new forms in an electronic document preparation system generates, for a first selected data field of the plurality of data fields of the new form, first candidate function data including a first set of candidate functions by performing a machine learning process at GENERATE, FOR A FIRST SELECTED DATA FIELD OF THE PLURALITY OF DATA FIELDS OF THE NEW FORM, FIRST CANDIDATE FUNCTION DATA INCLUDING A FIRST SET OF CANDIDATE FUNCTIONS BY PERFORMING A MACHINE LEARNING PROCESS 308, process flow proceeds to GENERATE, FOR THE FIRST SELECTED DATA FIELD OF THE PLURALITY OF DATA FIELDS OF THE NEW FORM, SECOND CANDIDATE FUNCTION DATA INCLUDING A SECOND SET OF CANDIDATE FUNCTIONS BY PERFORMING A NATURAL LANGUAGE PARSING PROCESS ON THE CONTEXT DATA RELATED TO THE FIRST SELECTED DATA FIELD 310.

In one embodiment, at GENERATE, FOR THE FIRST SELECTED DATA FIELD OF THE PLURALITY OF DATA FIELDS OF THE NEW FORM, SECOND CANDIDATE FUNCTION DATA INCLUDING A SECOND SET OF CANDIDATE FUNCTIONS BY PERFORMING A NATURAL LANGUAGE PARSING PROCESS ON THE CONTEXT DATA RELATED TO THE FIRST SELECTED DATA FIELD 310, process 300 for learning and incorporating new forms in an electronic document preparation system generates, for the first selected data field of the plurality of data fields of the new form, second candidate function data including a second set of candidate functions by performing a natural language parsing process on the context data related to the first selected field, according to one embodiment.

In one embodiment, once process 300 for learning and incorporating new forms in an electronic document preparation system generates, for the first selected data field of the plurality of data fields of the new form, second candidate function data including a second set of candidate functions by performing a natural language parsing process on the context data related to the first selected field at GENERATE, FOR THE FIRST SELECTED DATA FIELD OF THE PLURALITY OF DATA FIELDS OF THE NEW FORM, SECOND CANDIDATE FUNCTION DATA INCLUDING A SECOND SET OF CANDIDATE FUNCTIONS BY PERFORMING A NATURAL LANGUAGE PARSING PROCESS ON THE CONTEXT DATA RELATED TO THE FIRST SELECTED DATA FIELD 310, process flow proceeds to GENERATE, FOR THE FIRST SELECTED DATA FIELD OF THE PLURALITY OF DATA FIELDS OF THE NEW FORM, THIRD CANDIDATE FUNCTION DATA INCLUDING A THIRD SET OF CANDIDATE FUNCTIONS BY ANALYZING HISTORICAL SOFTWARE INSTRUCTIONS FOR PROVIDING A DATA VALUE FOR A DATA FIELD OF A HISTORICAL FORM RELATED TO THE NEW FORM 312.

In one embodiment, at GENERATE, FOR THE FIRST SELECTED DATA FIELD OF THE PLURALITY OF DATA FIELDS OF THE NEW FORM, THIRD CANDIDATE FUNCTION DATA INCLUDING A THIRD SET OF CANDIDATE FUNCTIONS BY ANALYZING HISTORICAL SOFTWARE INSTRUCTIONS FOR PROVIDING A DATA VALUE FOR A DATA FIELD OF A HISTORICAL FORM RELATED TO THE NEW FORM 312 the process 300 generates, for the first selected data field of the plurality of data fields of the new form, third candidate function data including a third set of candidate functions by analyzing historical software instructions for providing a data value for a data field of a historical form related to the new form, according to one embodiment.

In one embodiment, once process 300 generates, for the first selected data field of the plurality of data fields of the new form, third candidate function data including a third set of candidate functions by analyzing historical software instructions for providing a data value for a data field of a historical form related to the new form at GENERATE, FOR THE FIRST SELECTED DATA FIELD OF THE PLURALITY OF DATA FIELDS OF THE NEW FORM, THIRD CANDIDATE FUNCTION DATA INCLUDING A THIRD SET OF CANDIDATE FUNCTIONS BY ANALYZING HISTORICAL SOFTWARE INSTRUCTIONS FOR PROVIDING A DATA VALUE FOR A DATA FIELD OF A HISTORICAL FORM RELATED TO THE NEW FORM 312, process flow proceeds to GENERATE, FOR EACH CANDIDATE FUNCTION OF THE FIRST, SECOND, AND THIRD SETS, TEST DATA BY APPLYING THE CANDIDATE FUNCTION TO THE TRAINING SET DATA 314.

In one embodiment, at GENERATE, FOR EACH CANDIDATE FUNCTION OF THE FIRST, SECOND, AND THIRD SETS, TEST DATA BY APPLYING THE CANDIDATE FUNCTION TO THE TRAINING SET DATA 314 the process 300 for learning and incorporating new forms in an electronic document preparation system generates, for each candidate function of the first, second, and third sets, test data by applying the candidate function to the training set data, according to one embodiment.

In one embodiment, once the process 300 for learning and incorporating new forms in an electronic document preparation system generates, for each candidate function of the first, second, and third sets, test data by applying the candidate function to the training set data at GENERATE, FOR EACH CANDIDATE FUNCTION OF THE FIRST, SECOND, AND THIRD SETS, TEST DATA BY APPLYING THE CANDIDATE FUNCTION TO THE TRAINING SET DATA 314, process flow proceeds to COMPARE THE TEST DATA TO THE TRAINING SET DATA 316.

In one embodiment, at COMPARE THE TEST DATA TO THE TRAINING SET DATA 316 the process 300 for learning and incorporating new forms in an electronic document preparation system compares the test data to the training set data, according to one embodiment.

In one embodiment, once the process 300 for learning and incorporating new forms in an electronic document preparation system compares the test data to the training set data at COMPARE THE TEST DATA TO THE TRAINING SET DATA 316, process flow proceeds to SELECT ONE OR MORE OF THE CANDIDATE FUNCTIONS AS ACCEPTABLE CANDIDATE FUNCTIONS FOR THE FIRST SELECTED DATA FIELD BASED ON HOW CLOSELY THE TEST DATA FOR EACH CANDIDATE FUNCTION MATCHES DATA VALUES IN THE COMPLETED DATA FIELDS OF THE PREVIOUSLY FILLED FORMS THAT CORRESPOND TO THE FIRST SELECTED DATA FIELD 318.

In one embodiment, at SELECT ONE OR MORE OF THE CANDIDATE FUNCTIONS AS ACCEPTABLE CANDIDATE FUNCTIONS FOR THE FIRST SELECTED DATA FIELD BASED ON HOW CLOSELY THE TEST DATA FOR EACH CANDIDATE FUNCTION MATCHES DATA VALUES IN THE COMPLETED DATA FIELDS OF THE PREVIOUSLY FILLED FORMS THAT CORRESPOND TO THE FIRST SELECTED DATA FIELD, the process 300 for learning and incorporating new forms in an electronic document preparation system selects one or more of the candidate functions as acceptable candidate functions for the first selected data field based on how closely the test data for each candidate function matches data values in the completed data fields of the previously filled forms that correspond to the first selected data field, according to one embodiment.

In one embodiment, once the process 300 for learning and incorporating new forms in an electronic document preparation system selects one or more of the candidate functions as acceptable candidate functions for the first selected data field based on how closely the test data for each candidate function matches data values in the completed data fields of the previously filled forms that correspond to the first selected data field at SELECT ONE OR MORE OF THE CANDIDATE FUNCTIONS AS ACCEPTABLE CANDIDATE FUNCTIONS FOR THE FIRST SELECTED DATA FIELD BASED ON HOW CLOSELY THE TEST DATA FOR EACH CANDIDATE FUNCTION MATCHES DATA VALUES IN THE COMPLETED DATA FIELDS OF THE PREVIOUSLY FILLED FORMS THAT CORRESPOND TO THE FIRST SELECTED DATA FIELD 318 proceeds to OUTPUT RESULTS DATA INDICATING THE ONE OR MORE ACCEPTABLE FUNCTIONS 320.

In one embodiment, at OUTPUT RESULTS DATA INDICATING THE ONE OR MORE ACCEPTABLE FUNCTIONS 320 the process 300 for learning and incorporating new forms in an electronic document preparation system outputs results data indicating the one or more acceptable functions.

In one embodiment, once the process 300 for learning and incorporating new forms in an electronic document preparation system outputs results data indicating the one or more acceptable functions at OUTPUT RESULTS DATA INDICATING THE ONE OR MORE ACCEPTABLE FUNCTIONS 320, process flow proceeds to END 322.

In one embodiment, at END 322 the process for learning and incorporating new forms in an electronic document preparation system is exited to await new data and/or instructions.

Figure 4:
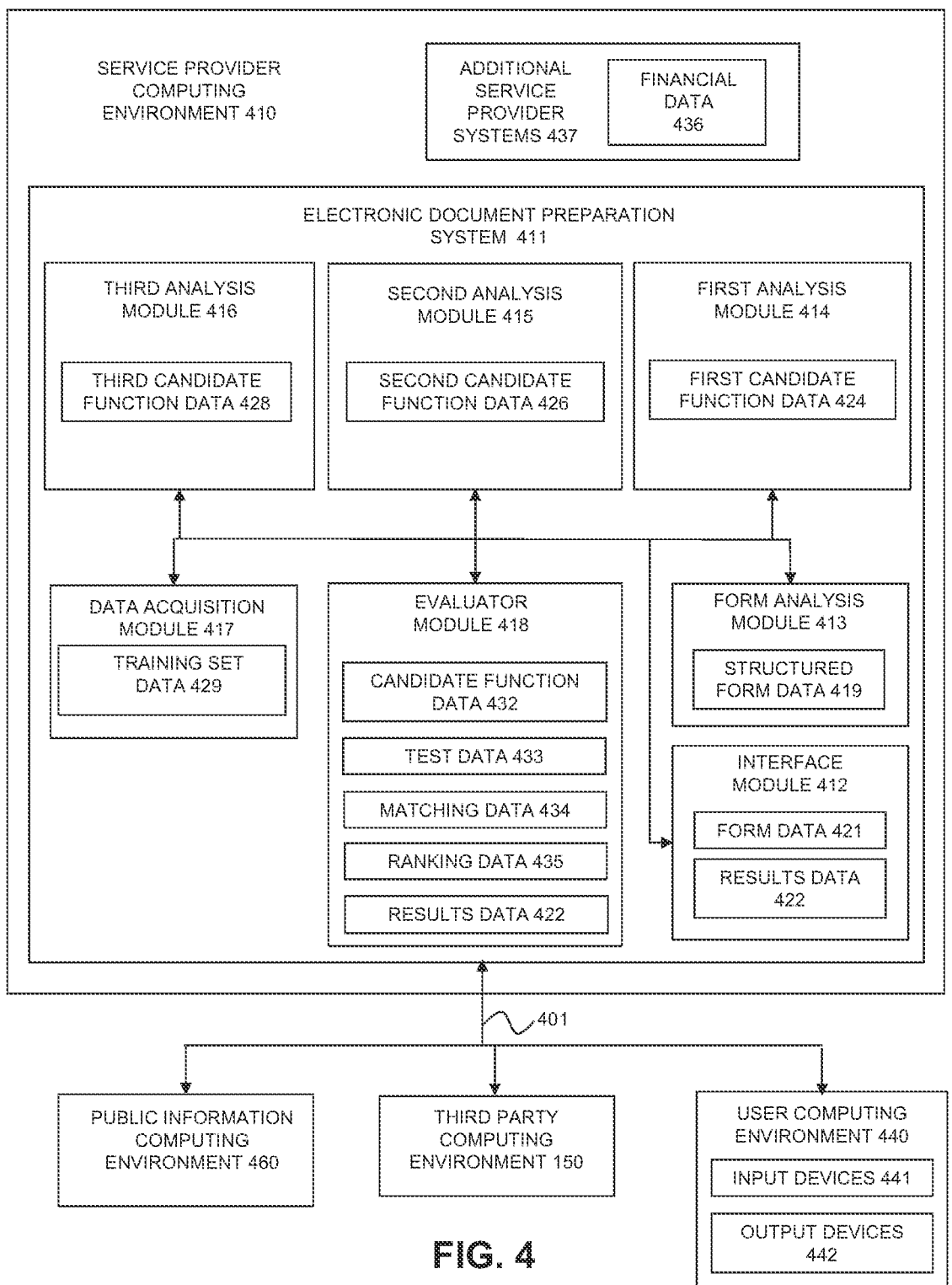
FIG. 4 is a block diagram of software architecture for learning and incorporating new forms in an electronic document preparation system, in accordance with one embodiment.

FIG. 4 illustrates a block diagram of a production environment 400 for learning and incorporating new forms in an electronic document preparation system, according to one embodiment.

The production environment 400 includes a service provider computing environment 410, user computing environment 440, third party computing environment 450, and public information computing environment 460, for learning and incorporating new forms in an electronic document preparation system, according to one embodiment. The computing environments 410, 440, 450, and 460 are communicatively coupled to each other with one or more communication channels 401, according to one embodiment.

The service provider computing environment 410 includes an electronic document preparation system 411, which is configured to provide electronic document preparation services to a user.

In one embodiment, the electronic document preparation system 411 includes a user interface module 412, a form analysis module 413, a first analysis module 414, a second analysis module 415, a third analysis module 416, a data acquisition module 417, and an evaluator module 418.

The interface module 412 is configured to receive form data 421 related to a new form. In one embodiment, the form data 421 may be in a visual form such as a PDF or in another format that does not readily enable cataloging of the individual data fields and corresponding context data of the new form. Accordingly, the electronic document preparation system 411 includes a form analysis module 413 that is configured to analyze the form data 421 and generates structured form data 419. The structured form data 419 can include data related the data fields, limiting values, tables, dependencies, variables, text descriptions, or other data related to the new form and its data fields.

In one embodiment, the first analysis module 414 generates, for a first data field of the new form, first candidate function data 424 including the first set of one or more candidate functions. The first analysis module 414 is configured to generate the first candidate function data 424 based on a first analysis technique or analysis process. The first analysis module 414 provides the first candidate function data 424 to the evaluator module 418.

In one embodiment, the second analysis module 415 generates, for the first data field of the new form, second candidate function data 426 including a second set of one or more candidate functions. The second analysis module 415 is configured to generate the second candidate function data 426 based on a second analysis technique or analysis process different than the first analysis technique or process. The second analysis module 415 provides the second candidate function data 426 to the evaluator module 418.

In one embodiment, the third analysis module 416 generates, for the first data field of the new form, third candidate function data 428 including a third set of one or more candidate functions. The third analysis module 416 is configured to generate third candidate function data 428 based on a third analysis technique or analysis process different than the first and second analysis techniques or processes. The third analysis module 416 provides the third candidate function data 428 to the evaluator module 418.

In one embodiment, the data acquisition module 417 is configured to gather training set data 429. The training set data 429 includes a large number of previously filled forms related to the new form. Each of the previously filled forms includes completed data fields correspond to the data fields of the new form. In one embodiment, the previously filled forms can include previous versions of the new form.

In one embodiment, the evaluator module 418 generates candidate function data 432 by combining the first candidate function data 424, the second candidate function data 426, and the third candidate function data 428. The evaluator module 418 generates, for each candidate function, test data 433 by applying the candidate function to the training set data 429. The evaluator module 418 then generates matching data 434 for each candidate function by comparing the test data for that candidate function to the training set data 429. The matching data indicates how closely the test data 433 matches the training set data 429. Evaluator module 418 then generates ranking data 435 by ranking of each of the candidate functions based on how closely their respective test data 433 matches the training set data 429. The evaluator module 418 then generates results data 436 indicating one or more acceptable candidate functions based on the ranking data 435. In one embodiment, a candidate function is an acceptable function if the test data 433 exactly matches the training set data 429. Alternatively, a candidate function can be an acceptable function if the test data 433 matches the training set data 429 within a threshold error tolerance. The evaluator module can cause the interface module 412 to output the results data 422.

In one embodiment, after the electronic document preparation system 411 finds one or more acceptable candidate functions for the first selected data field, the electronic document preparation system 411 can continue to find acceptable candidate functions for other selected data fields of the new form in a similar manner.

In one embodiment, the first, second, and third analysis modules 414, 415, 416 include one or more of a machine learning module, a natural language parsing module, and a historical instructions analysis module. The first, second, and third analysis modules can include analysis modules or techniques other than those listed above. Those of skill in the art will recognize, in light of the present disclosure, that many other analysis modules or analysis techniques can be used in an electronic document preparation system 411. All such other analysis modules and techniques fall within the scope of the present disclosure.

As noted above, the specific illustrative examples discussed above are but illustrative examples of implementations of embodiments of the method or process for learning and incorporating new forms in an electronic document preparation system. Those of skill in the art will readily recognize that other implementations and embodiments are possible. Therefore, the discussion above should not be construed as a limitation on the claims provided below.

In one embodiment, a computing system implements a method for learning and incorporating new forms in an electronic document preparation system. The method includes generating structured form data by analyzing form data related to a new form having a plurality of data fields. The structured form data identifies the data fields of the new form and context data related to context describing the data fields of the new form. The method also includes gathering training set data related to previously filled forms, each previously filled form having completed data fields that each correspond to a respective data field of the new form and generating, for a first selected data field of the plurality of data fields of the new form, first candidate function data including a first set of candidate functions by performing a machine learning process, and generating, for the first selected data field of the plurality of data fields of the new form, second candidate function data including a second set of candidate functions by performing a natural language parsing process on the context data related to the first selected field. The method also includes generating, for the first selected data field of the plurality of data fields of the new form, third candidate function data including a third set of candidate functions by analyzing historical software instructions for providing a data value for a data field of a historical form related to the new form. The method also includes generating, for each candidate function of the first, second, and third sets, test data by applying the candidate function to the training set data. The method also includes comparing the test data to the training set data, selecting one or more of the candidate functions as acceptable candidate functions for the first selected data field based on how closely the test data for each candidate function matches data values in the completed data fields of the previously filled forms that correspond to the first selected data field, outputting results data indicating the one or more acceptable functions.

In one embodiment, a computing system implements a method for learning and incorporating new forms in an electronic document preparation system. The method includes generating structured form data by analyzing form data related to a new form having a plurality of data fields. The structured form data identifies the data fields of the new form and context data related to the data fields of the new form. The method also includes gathering training set data related to previously filled forms. Each previously filled form has completed data fields that each correspond to a respective data field of the new form. The method also includes generating, for a first selected data field of the plurality of data fields of the new form, first candidate function data including a first set of candidate functions based on a first analysis process. The method also includes generating, for the first selected data field of the plurality of data fields of the new form, second candidate function data including a second set of candidate functions based on a second analysis process. The method also includes generating, for each candidate function of the first and second sets, test data by applying the candidate function to the training set data. The method also includes comparing the test data to the training set data. The method also includes selecting one or more of the candidate functions as acceptable candidate functions for the first selected data field based on how closely the test data for each candidate function matches data values in the completed data fields of the previously filled forms that correspond to the first selected data field and outputting results data indicating the one or more acceptable functions.

In one embodiment, a system for learning and incorporating new forms in an electronic document preparation system includes at least one processor and at least one memory coupled to the at least one processor, the at least one memory having stored therein instructions which, when executed by any set of the one or more processors, perform a process. The process includes receiving, with an interface module of a computing system, form data related to a new form having a plurality of data fields and generating, a form analysis module of a computing system, structured form data by analyzing the new form. The structured form data identifies the data fields of the new form and context data related to context describing the data fields of the new form. The process also includes gathering, with a data acquisition module of a computing system, training set data related to previously filled forms. Each previously filled form has completed data fields that each correspond to a respective data field of the new form. The process also includes generating, with a machine learning module of a computing system and for a first selected data field of the plurality of data fields of the new form, first candidate function data including a first set of candidate functions by performing a machine learning process. The process also includes generating, with a natural language parsing module of a computing system and for the first selected data field of the plurality of data fields of the new form, second candidate function data including a second set of candidate functions by performing a natural language parsing process on the context data related to the first selected field. The process also includes generating, with a historical instructions analysis module of a computing system, for the first selected data field of the plurality of data fields of the new form, third candidate function data including a third set of candidate functions by analyzing historical software instructions for providing a data value for a data field of a historical form related to the new form. The process also includes generating, with an evaluator module of a computing system, for each candidate function of the first, second, and third sets, test data by applying the candidate function to the training set data and comparing, with the evaluator module, the test data to the training set data. The process also includes selecting, with the evaluator module, one or more of the candidate functions as acceptable candidate functions for the first selected data field based on how closely the test data for each candidate function matches data values in the completed data fields of the previously filled forms that correspond to the first selected data field and outputting, with the evaluator module, results data indicating the one or more acceptable functions In one embodiment, a non-transitory computer-readable medium has a plurality of computer-executable instructions which, when executed by a processor, perform a method for learning and incorporating new forms in an electronic document preparation system. The instructions include an interface module configured to receive form data representing to a new form having a plurality of data fields and a form analysis module configured to generate structured form data by analyzing the new form, the structured form data identifying the data fields of the new form and context data related to context describing the data fields of the new form. The instructions also include a data acquisition module configured to gather training set data related to previously filled forms, each previously filled form having completed data fields that each correspond to a respective data field of the new form. The instructions also include a first data field analysis module configured to generate first candidate function data including one or more candidate functions for each selected data field from the plurality of data fields of the new form. The instructions also include a second data field analysis module configured to generate second candidate function data including one or more candidate functions for each selected data field from the plurality of data fields of the new form. The process also includes an evaluator module configured to identify, for each selected data field of the new form, one or more acceptable candidate functions from the first and second candidate function data by generating test data by applying the candidate functions to the training set data and ranking the candidate functions for each selected data field based on how closely the test data for each candidate function matches corresponding data values in the training set data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language, and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for learning and incorporating new forms in an electronic document preparation system, the method comprising:
   generating structured form data by analyzing form data related to a new form having a plurality of data fields, the structured form data identifying the data fields of the new form and context data related to context describing the data fields of the new form;
   gathering training set data related to previously filled forms, each previously filled form having completed data fields that each correspond to a respective data field of the new form;
   performing a machine learning process to generate, for a first selected data field of the plurality of data fields of the new form, first candidate function data including a first set of candidate functions, each candidate function of the first set of candidate functions including one or more arithmetic operators, or one or more logical operators, the machine learning process generating the first candidate function data based at least in part on the context data;
   generating, for each candidate function of the first set of candidate functions, test data by applying the corresponding one or more arithmetic operators or one or more logical operators of each candidate function to the training set data;
   comparing the test data to the training set data;
   selecting one or more of the candidate functions as acceptable candidate functions for the first selected data field based on how closely the test data for each candidate function matches data values in the completed data fields of the previously filled forms that correspond to the first selected data field; and
   outputting results data indicating the one or more acceptable functions.

2. The method of claim 1, wherein comparing the test data to the training set data includes generating, for each candidate function of the first set, matching data indicating how closely the test data matches the data values in the completed data fields of the previously filled forms that correspond to the first selected data field.

3. The method of claim 2, further comprising generating ranking data that ranks the candidate functions based on how closely the test data for each candidate function matches the data values in the completed data fields of the previously filled form that correspond to the first selected data field.

4. The method of claim 1, wherein the machine learning process includes:
   generating, for the first selected data field of the plurality of data fields of the new form, dependency data indicating one or more possible dependencies for the first selected data field based on the context data related to the first selected data field; and
   generating the first set of candidate functions based on the dependency data and one or more operators selected from a set of operators.

5. The method of claim 4, wherein generating the dependency data includes generating dependency by analyzing historical software instructions for providing a data value for a data field of a historical form related to the new form.

6. The method of claim 1, wherein the context data includes text data describing a correct function for providing the data value in the first selected field.

7. The method of claim 1, wherein the new form is a tax form.

8. A computing system implemented method for learning and incorporating new forms in an electronic document preparation system, the method comprising:
   generating structured form data by analyzing form data related to a new form having a plurality of data fields, the structured form data identifying the data fields of the new form and context data related to the data fields of the new form;
   gathering training set data related to previously filled forms, each previously filled form having completed data fields that each correspond to a respective data field of the new form;
   performing a machine learning process to generate, for a first selected data field of the plurality of data fields of the new form, first candidate function data including a first set of candidate functions, each candidate function in the first set of candidate functions including one or more arithmetic operators or one or more logical operators, the machine learning process generating the first candidate function data based at least in part on the context data;
   generating, for each candidate function of the first set of candidate functions, test data by applying the corresponding one or more arithmetic operators or one or more logical operators of each candidate function to the training set data;
   comparing the test data to the training set data;
   selecting one or more of the candidate functions as acceptable candidate functions for the first selected data field based on how closely the test data for each candidate function matches data values in the completed data fields of the previously filled forms that correspond to the first selected data field; and
   outputting results data indicating the one or more acceptable functions.

9. The method of claim 8, wherein generating the test data includes generating the test data for each candidate function of the first set of candidate functions.

10. The method of claim 8, wherein the machine learning process includes:
    generating, for the first selected data field of the plurality of data fields of the new form, dependency data indicating one or more possible dependencies for the first selected data field based on the context data related to the first selected data field; and
    generating the first set of candidate functions based on the dependency data and one or more operators selected from a set of operators.

11. The method of claim 10, wherein generating the dependency data includes generating dependency by analyzing historical software instructions for providing a data value for a data field of a historical form related to the new form.

12. The method of claim 8, further comprising generating ranking data that ranks the candidate functions based on how closely the test data for each candidate function matches the data values in the completed data fields of the previously filled form that correspond to the first selected data field.

13. The method of claim 8, wherein the new form is a tax form.

14. A system for learning and incorporating new forms in an electronic document preparation system, the system comprising:
   at least one processor; and
   at least one memory coupled to the at least one processor, the at least one memory having stored therein instructions which, when executed by any set of the one or more processors, perform a process including:
      receiving, form data related to a new form having a plurality of data fields;
      generating, structured form data by analyzing the new form, the structured form data identifying the data fields of the new form and context data related to context describing the data fields of the new form;
      gathering, training set data related to previously filled forms, each previously filled form having completed data fields that each correspond to a respective data field of the new form;
      performing a machine learning process to generate first candidate data including a first set of candidate functions for a first selected data field of the plurality of data fields of the new form, each candidate function of the first set of candidate functions including one or more arithmetic operators or one or more logical operators, the machine learning process generating the first candidate function data based at least in part on the context data;
      generating, for each candidate function of the first set of candidate functions, test data by applying the corresponding one or more arithmetic operators or one or more logical operators of each candidate function to the training set data;
      comparing the test data to the training set data;
      selecting one or more of the candidate functions as acceptable candidate functions for the first selected data field based on how closely the test data for each candidate function matches data values in the completed data fields of the previously filled forms that correspond to the first selected data field; and
      outputting results data indicating the one or more acceptable functions.

15. The system of claim 14, wherein comparing the test data to the training set data includes generating, for each candidate function of the first set of candidate functions, matching data indicating how closely the test data matches the data values in the completed data fields of the previously filled forms that correspond to the first selected data field.

16. The system of claim 15, wherein the process includes generating ranking data that ranks the candidate functions based on how closely the test data for each candidate function matches the data values in the completed data fields of the previously filled form that correspond to the first selected data field.

17. The system of claim 14, wherein the machine learning process includes:
   generating, for the first selected data field of the plurality of data fields of the new form, dependency data indicating one or more possible dependencies for the first selected data field based on the context data related to the first selected data field; and
   generating the first set of candidate functions based on the dependency data and one or more operators selected from a set of operators.

18. The system of claim 17, wherein generating the dependency data includes generating dependency by analyzing historical software instructions for providing a data value for a data field of a historical form related to the new form.

19. The system of claim 14, wherein the electronic document preparation system includes a financial document preparation system.

20. The system of claim 19, wherein the financial document preparation system includes a tax return preparation system.

* * * * *